United States Patent
Kim et al.

(10) Patent No.: US 9,676,960 B2
(45) Date of Patent: Jun. 13, 2017

(54) COMPOSITION FOR MAKING HARD COATING LAYER

(71) Applicant: SK INNOVATION CO., LTD., Seoul (KR)

(72) Inventors: Won-Yeob Kim, Daejeon (KR); Chul-Soon Moon, Daejeon (KR); Hye-Jin Kim, Daejeon (KR); Ho-Chul Yoon, Daejeon (KR); Jae-Eun Lee, Seoul (KR); Jong-Nam Ahn, Daejeon (KR); Youngjune Park, Seoul (KR)

(73) Assignee: SK INNOVATION CO., LTD., Seoul (KR)

( * ) Notice: Subject to any disclaimer, the term of this patent is extended or adjusted under 35 U.S.C. 154(b) by 0 days.

(21) Appl. No.: 14/824,823

(22) Filed: Aug. 12, 2015

(65) Prior Publication Data

US 2016/0046830 A1    Feb. 18, 2016

(30) Foreign Application Priority Data

Aug. 13, 2014 (KR) .................. 10-2014-0105082

(51) Int. Cl.
| | | |
|---|---|---|
| *C09D 183/04* | (2006.01) | |
| *C09D 151/08* | (2006.01) | |
| *C08J 7/04* | (2006.01) | |
| *C08G 77/04* | (2006.01) | |
| *C08G 77/20* | (2006.01) | |
| *C09D 183/06* | (2006.01) | |
| *C08G 77/14* | (2006.01) | |

(52) U.S. Cl.
CPC ....... *C09D 151/085* (2013.01); *C08G 77/045* (2013.01); *C08G 77/20* (2013.01); *C08J 7/047* (2013.01); *C09D 183/04* (2013.01); *C09D 183/06* (2013.01); *C08G 77/14* (2013.01); *C08J 2367/02* (2013.01); *C08J 2483/04* (2013.01)

(58) Field of Classification Search
None
See application file for complete search history.

(56) References Cited

U.S. PATENT DOCUMENTS

| | | | | |
|---|---|---|---|---|
| 6,896,960 B2* | 5/2005 | Shoshi | ............... | C08F 283/00 |
| | | | | 428/323 |
| 2006/0083925 A1* | 4/2006 | Laine | ............... | C07F 7/21 |
| | | | | 428/405 |
| 2007/0065660 A1* | 3/2007 | Okamoto | ............... | C09D 5/24 |
| | | | | 428/328 |
| 2008/0107978 A1* | 5/2008 | Yanus | ............... | G03G 5/0532 |
| | | | | 430/48 |

(Continued)

FOREIGN PATENT DOCUMENTS

| | | | | |
|---|---|---|---|---|
| JP | WO 2012060267 A1 * | 5/2012 | ............... | B32B 7/12 |
| KR | 1020130074167 | 7/2013 | | |

OTHER PUBLICATIONS

Sellinger et al. "Silsesquioxanes as Synthetic Platforms. 3. Photocurable, Liquid Epoxides as Inorganic/Organic Hybrid Precursors" Chem. Mater. 1996, 8, 1592-1593.*

*Primary Examiner* — Robert S Loewe
(74) *Attorney, Agent, or Firm* — IP & T Group LLP

(57) ABSTRACT

The present invention relates to a composition for forming a hard coating layer, which may form a hard coating layer having significantly improved hardness as well as excellent flexibility such that curling is minimized.

17 Claims, 18 Drawing Sheets

(56) References Cited

U.S. PATENT DOCUMENTS

| | | | |
|---|---|---|---|
| 2008/0188614 A1* | 8/2008 | Woerner | C08K 9/06 524/588 |
| 2009/0002820 A1* | 1/2009 | Okano | G02B 1/105 359/483.01 |
| 2010/0103352 A1* | 4/2010 | Suzuki | B29C 47/0021 349/96 |
| 2010/0222503 A1* | 9/2010 | Laine | C08G 77/045 524/588 |
| 2010/0280561 A1* | 11/2010 | Song | C08G 83/002 606/86 R |
| 2012/0003437 A1* | 1/2012 | Wada | G03F 7/0757 428/195.1 |
| 2012/0003575 A1* | 1/2012 | Yu | G03G 5/0507 430/56 |
| 2012/0004360 A1* | 1/2012 | Tomaru | G02B 5/3025 524/558 |
| 2013/0194211 A1* | 8/2013 | Shinohara | G02B 1/115 345/173 |
| 2014/0046005 A1* | 2/2014 | Leong | C08L 67/04 525/450 |
| 2014/0335448 A1* | 11/2014 | Sekito | H01L 21/02126 430/18 |

\* cited by examiner

COMPOSITION FOR MAKING HARD COATING LAYER

CROSS-REFERENCE TO RELATED APPLICATION

This application claims priority to and the benefit of Korean Patent Application No. 2014-0105082, filed on Aug. 13, 2014, the disclosure of which is incorporated herein by reference in its entirety.

BACKGROUND

1. Field of the Invention

The present invention relates to a composition for forming a hard coating layer.

2. Discussion of Related Art

Recently, thin display devices using flat display devices such as liquid crystal display devices, organic light emitting diode display devices or the like have received much attention. Especially, these thin display devices are implemented in the form of a touch screen panel and are widely used in a variety of smart devices characterized by portability such as smart phones, tablets, PCs and a diversity of wearable devices.

These portable display devices based on a touch screen panel includes a window cover for protecting displays on a display panel to protect a display panel from scratches or external shocks. In most cases, tempered glass for display is used as the window cover. Tempered glass for display is thinner than general glass, but has high strength and scratch resistance.

However, a heavy weight of tempered glass is unsuitable for reducing the weight of portable devices. Further, tempered glass is difficult to implement unbreakable characteristics due to its vulnerability to external shocks. Tempered glass may only bend to a limited degree, and thus is unsuitable as a material for flexible displays which are bendable and foldable.

In recent, various researches on an optical plastic cover ensuring flexibility and impact resistance, and having strength or scratch resistance equal to those of tempered glass have been conducted. Generally, examples of the optical plastic covers which are more flexible than tempered glass include polyethylene terephthalate (PET), polyethersulfone (PES), polyethylene naphthalate (PEN), polyacrylate (PAR), polycarbonate (PC), polyimide (PI), etc. However, these polymer plastic substrates exhibit insufficient physical properties of hardness and scratch resistance as compared to tempered glass used as a window cover for protecting displays, and also has insufficient impact resistance. Accordingly, many attempts to complement the physical properties by coating these plastic substrates with a composite resin composition have been in progress.

In a general hard coating process, a composition including a resin having photocurable functional groups such as a (meth)acrylate group, an epoxy group or the like and a curing agent or a curing catalyst and a reactive additive is used. Especially, a composite resin having a high functional group may be used as a window cover for protecting displays having improved hardness and scratch resistance when an optical plastic base material film is coated with the composite resin.

However, in the case of general photocurable composite resins having a high functional group of a (meth)acrylate or epoxy group, it is difficult to implement high hardness equal to that of tempered glass, and a curling phenomenon due to shrinkage occurs upon curing the resin. Flexibility is also insufficient, and thus these resins are unsuitable as a window substrate for protecting displays to be applied to flexible displays.

A plastic substrate is disclosed in Korean Laid-open Patent Application No. 2013-74167.

PATENT DOCUMENT

Korean Laid-open Patent Application No. 2013-74167

SUMMARY OF THE INVENTION

The objective of the present invention is directed to providing a composition which may form a hard coating layer having significantly improved hardness.

The objective of the present invention is directed to providing a composition which may form a hard coating layer having excellent flexibility.

The objective of the present invention is directed to providing a hard coating film having the hard coating layer.

According to an aspect of the present invention, there is provided a composition for forming a hard coating layer, including: first and second silsesquioxane resins which have a weight average molecular weight of 500 or more but less than 30,000 and are substituted with a substituent of a (meth)acrylate group, a vinyl group or an epoxy group, the substituent has an equivalent ratio of 50% or more, and the hydrodynamic radius ratio of the first silsesquioxane resin to the second silsesquioxane resin represented by the following Equation 1 is more than 1.00 but 3.00 or less:

Hydrodynamic radius of second silsesquioxane resin/
hydrodynamic radius of first silsesquioxane resin        [Equation 1]

The hydrodynamic radius ratio of the first silsesquioxane resin to the second silsesquioxane resin may be more than 1.00 but 2.00 or less.

The substituent of the first and second silsesquioxane resins may have an equivalent ratio of 80% or more, and a hydrodynamic radius ratio of the first silsesquioxane resin to the second silsesquioxane resin may be more than 1.00 but 1.50 or less.

The first and second silsesquioxane resins may be included at a weight ratio in a range of 1:9 to 9:1.

The first and second silsesquioxane resins may be included at a weight ratio in a range of 3:7 to 7:3.

The total content of the first and second silsesquioxane resins may be 10 to 90 wt % based on a total weight of the composition.

The composition for forming a hard coating layer may further include an oligomer having a functional group which is crosslinkable with the first and second silsesquioxane resins.

The oligomer may be a (meth)acrylate oligomer, a vinyl oligomer or an epoxy oligomer.

The composition for forming a hard coating layer may further include a reactive monomer having a functional group which is crosslinkable with the first and second silsesquioxane resins.

The reactive monomer may be a (meth)acrylate monomer, a vinyl monomer or an epoxy monomer.

The composition for forming a hard coating layer may further include an inorganic filler.

The composition for forming a hard coating layer may further include at least one type selected from the group consisting of a photo-radical polymerization initiator, a photo-cationic polymerization initiator and a thermal polymerization initiator.

According to another aspect of the present invention, there is provided a hard coating film, including a base material of which at least one surface has a hard coating layer formed of the above-described composition.

The base material may be made from least one resin selected from the group consisting of a polyester-based resin, a cellulose-based resin, a polycarbonate-based resin, an acrylic resin, a styrene-based resin, a polyolefin-based resin, a polyimide-based resin, a polyether sulfone-based resin and a sulfone-based resin.

One surface of the base material may have the hard coating layer, and another surface of the base material may have an anti-curl back coating layer.

A crack-preventing layer may be further formed on the anti-curl back coating layer.

The hard coating film may be a window cover at an outermost surface of a display panel.

According to yet another aspect of the present invention, there is provided an image display device, including the above-described hard coating film.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
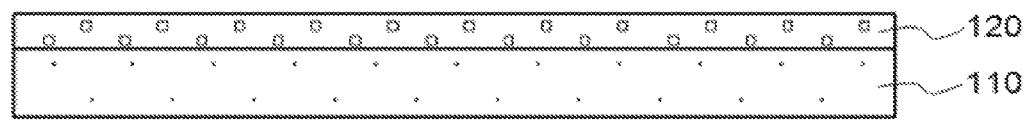
FIG. 1 is a schematic cross-sectional view of a hard coating film including a hard coating layer formed of a composition for forming a hard coating layer according to an embodiment of the present invention.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

The present invention relates to a composition for forming a hard coating layer, which may form a hard coating layer having significantly improved hardness as well as excellent flexibility such that curling is minimized.

Hereinafter, the present invention will be described in detail.

Composition for Forming Hard Coating Layer

A composition for forming a hard coating layer according to an embodiment of the present invention includes first and second silsesquioxane resins which have a weight average molecular weight of 500 or more but less than 30,000, are substituted with a substituent of a (meth)acrylate group, a vinyl group or an epoxy group, the substituent has an equivalent ratio of 50% or more, and a hydrodynamic radius ratio of the first silsesquioxane resin to the second silsesquioxane resin represented by the following Equation 1 is more than 1.00 but 3.00 or less.

Hydrodynamic radius of second silsesquioxane resin/
hydrodynamic radius of first silsesquioxane
resin [Equation 1]

Since two types of silsesquioxane resins having the equivalent ratio and hydrodynamic radius in the specific ranges are used in the composition for forming a hard coating layer according to the embodiment of the present invention, the hardness of the hard coating layer may be significantly improved. Furthermore, flexibility is considerably enhanced such that curling may be suppressed. This is determined to result from improving intermolecular adhesion by minimizing intermolecular voids forming silsesquioxane resins.

The first and second silsesquioxane resins according to the embodiment of the present invention include a complete-cage type silsesquioxane resin, an incomplete-cage type silsesquioxane resin, a ladder type silsesquioxane resin, a random type silsesquioxane resin and a mixture thereof, and may be represented by the following Formula 1 which is a representative formula of the above-described structures.

$(R^1SiO_{3/2})_x(R^2SiO_{3/2})_y(R^3SiO_{3/2})_z$ [Formula 1]

(where $R^1$ is a photoreactive hydrocarbon group having 1 to 50 carbon atoms and including a (meth)acrylate group, a vinyl group or an epoxy group, $R^2$ is a non-photoreactive hydrocarbon group having 1 to 50 carbon atoms, $R^3$ is a photoreactive hydrocarbon group having 1 to 50 carbon atoms and including a (meth)acrylate group, a vinyl group or an epoxy group, and x, y and z each are independently integers in the range of 1 to 180)

In the present specification, "(meth)acrylate" refers to acrylate or methacrylate, "epoxy" refers to glycidyl, epoxy cyclohexyl or oxetane, and examples of the hydrocarbon group include an alkyl group, a cycloalkyl group, an aryl group or the like, but the present invention is not limited thereto.

The photoreactive hydrocarbon group refers to a hydrocarbon group including a (meth)acrylate group, a vinyl group or an epoxy group, and the non-photoreactive hydrocarbon group refers to a hydrocarbon group not including a (meth)acrylate group, a vinyl group or an epoxy group.

In the present specification, an equivalent ratio refers to a ratio of the photoreactive hydrocarbon group to the non-photoreactive hydrocarbon group in the first and second silsesquioxane resins, and is represented by the following Equation 2.

Equivalent ratio (%)=$(x+z)/(x+y+z) \times 100$ [Equation 2]

In Equation 2, x and z represent a molar ratio of a siloxane having the photoreactive hydrocarbon group in Formula 1, y represents a molar ratio of a siloxane having the non-photoreactive hydrocarbon group in Formula 1, and the description for x, y and z is the same as in Formula 1.

Each equivalent ratio of the first and second silsesquioxane resins is 50% or more, and the hydrodynamic radius ratio of the first silsesquioxane resin to the second silsesquioxane resin is more than 1.00 but 3.00 or less. When each equivalent ratio of the first and second silsesquioxane resins is less than 50%, hardness is significantly reduced. Further, when the hydrodynamic radius ratio of the first silsesquioxane resin to the second silsesquioxane resin is more than 3.00, hardness is also significantly reduced.

The equivalent ratio and hydrodynamic radius ratio of the first and second silsesquioxane resins have a constant correlation, and thus the optimum hydrodynamic radius ratio for implementing high hardness of the equivalent ratio is different. Accordingly, considering the hardness improvement, preferably, each equivalent ratio of the first and second silsesquioxane resins is 50% or more and the hydrodynamic radius ratio is more than 1.00 but 2.00 or less, and more preferably, each equivalent ratio of the first and second silsesquioxane resins is 80% or more and the hydrodynamic radius ratio is more than 1.00 but 1.50 or less.

The hydrodynamic radius (Rh) of the silsesquioxane resins are obtained by calculating a diffusion coefficient of the silsesquioxane resins in $CDCl_3$ as a solvent using nuclear magnetic resonance (NMR) at 25° C., and substituting the diffusion coefficient into the Stokes-Einstein equation. The Stokes-Einstein equation is represented by the following Equation 3.

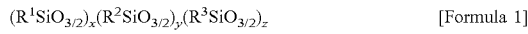

$D=kT/6\pi\eta Rh$ [Equation 3]

(where k is Boltzmann's constant, T is a temperature (° C.), η is a viscosity (Pa·s) of a $CDCl_3$ solution and D is a diffusion coefficient)

The mixing ratio of the first and second silsesquioxane resins is not particularly limited, and for example, may be in the range of 1:9 to 9:1. When the mixing ratio of the first and second silsesquioxane resins is out of the above-described range, the effect of improving physical properties by mixing is low. Considering the improvement of hardness and flexibility, the mixing ratio of the first and second silsesquioxane resins is more preferably in the range of 3:7 to 7:3.

The contents of the first and second silsesquioxane resins are not particularly limited, and for example, the total content may be in the range of 10 to 90 wt % based on the total weight of the composition. When the total content is less than 10 wt %, high hardness is difficult to be implemented due to a low content of the resin. When the total content is more than 90 wt %, flexibility decreases, and thus cracks may easily occur. In consideration of the high hardness and high flexibility, the total content may be preferably in the range of 20 to 70 wt %.

The composition for forming a hard coating layer according to the embodiment of the present invention may further include an oligomer having a functional group which is crosslinkable with the above-described silsesquioxane resins to enhance hardness and flexibility.

That is, when the silsesquioxane resin is substituted with a (meth)acrylate group, the composition for forming a hard coating layer according to the embodiment of the present invention may further include a (meth)acrylate oligomer, when the silsesquioxane resin is substituted with a vinyl group, the composition may further include a vinyl oligomer, and when the silsesquioxane resin is substituted with an epoxy group, the composition may further include an epoxy oligomer.

Hereinafter, the case in which the (meth)acrylate oligomer is used will be described in detail, but the present invention is not limited thereto.

The (meth)acrylate oligomer according to the embodiment of the present invention is not particularly limited, and may include a polyester acrylate, urethane acrylate, epoxy acrylate, polyether acrylate oligomer, etc. Preferably, the urethane acrylate oligomer may be used.

Hereinafter, the case of the urethane acrylate oligomer will be described in detail, but the present invention is not limited thereto.

The urethane acrylate oligomer according to the embodiment of the present invention may have 2 to 15 functional groups. When the number of the functional group is less than 2, the effect of improving hardness is low, and when the number of the functional group is more than 15, excellent hardness may be obtained, but viscosity may increase.

The urethane (meth)acrylate oligomer which is well-known in the related field may be used herein without limitation. Preferably, the urethane (meth)acrylate oligomer prepared by reacting a compound having at least one isocyanate group in its molecule with a (meth)acrylate compound having at least one hydroxyl group in its molecule may be used.

A specific example of the compound having at least one isocyanate group in its molecule includes at least one selected from the group consisting of 4,4'-dicyclohexyl diisocyanate, hexamethylene diisocyanate trimer, 1,4-diisocyanato butane, 1,6-diisocyanato hexane, 1,8-diisocyanato octane, 1,12-diisocyanato decane, 1,5-diisocyanato-2-methylpentane, trimethyl-1,6-diisocyanatohexane, 1,3-bis(isocyanatomethyl)cyclohexane, trans-1,4-cyclohexene diisocyanate, 4,4'-methylenebis(cyclohexyl isocyanate), isophorone diisocyanate, toluene-2,4-diisocyanate, toluene-2,6-diisocyanate, xylene-1,4-diisocyanate, tetramethylxylene-1,3-diisocyanate, 1-chloromethyl-2,4-diisocyanate, 4,4'-methylene-bis(2,6-dimethyl-phenyl isocyanate), 4,4'-oxybis(phenyl isocyanate), trifunctional isocyanate derived from hexamethylene diisocyanate, the adduct of toluene diisocyanate with trimethylolpropane, acryloyl ethyl isocyanate, methacryloyl ethyl isocyanate, trifunctional isocyanate derived from isophorone diisocyanate, and hexamethylene diisocyanate biuret.

A specific example of the (meth)acrylate compound having at least one hydroxyl group in its molecule include at least one selected from the group consisting of 2-hydroxyethyl(meth)acrylate, 2-hydroxy-isopropyl (meth)acrylate, 4-hydroxybutyl (meth)acrylate, caprolactone-modified hydroxy acrylate, a pentaerythritol tri/tetra(meth)acrylate mixture, and a dipentaerythritol penta/hexa (meth)acrylate mixture.

The molecular weight of the oligomer according to the embodiment of the present invention is not particularly limited, and for example, may be in the range of 500 to 100,000. When the weight average molecular weight is less than 500, hardness may decrease, and when the weight average molecular weight is more than 100,000, viscosity is too high, and thus coating is difficult to be performed.

The content of the oligomer according to the embodiment of the present invention is not particularly limited, and for example, may be included at 5 to 70 wt % based on the total weight of the composition. When the content of the oligomer is less than 5 wt %, cracking and curling may occur due to shrinkage, and when the content of the oligomer is more than 70 wt %, the content of the resin relatively decreases, and thus the effect of improving hardness may be inhibited.

The composition for forming a hard coating layer according to the embodiment of the present invention may further include a reactive monomer having a functional group which is crosslinkable with the above-described silsesquioxane resin to enhance flexibility and increase processibility through a viscosity adjustment.

That is, when the silsesquioxane resin is substituted with a (meth)acrylate group, the composition for forming a hard coating layer according to the embodiment of the present invention may further include a (meth)acrylate monomer, when the silsesquioxane resin is substituted with a vinyl group, the composition may further include a vinyl monomer, and when the silsesquioxane resin is substituted with an epoxy group, the composition may further include an epoxy monomer.

Specific examples of the (meth)acrylate monomer include 2-ethylhexyl acrylate, octadecyl acrylate, isodecyl acrylate, 2-phenoxyethyl acrylate, lauryl acrylate, stearyl acrylate, behenyl acrylate, tridecyl methacrylate, nonylphenol ethoxylate monoacrylate, β-carboxyethyl acrylate, isobornyl acrylate, tetrahydrofurfuryl acrylate, tetrahydrofurfuryl methacrylate, 4-butyl-cyclohexyl acrylate, dicyclopentenyl acrylate, dicyclopentenyl oxyethyl acrylate, ethoxyethoxy ethyl acrylate, ethoxylated monoacrylate, 1,6-hexanediol diacrylate, triphenyl glycol diacrylate, butanediol diacrylate, 1,3-butylene glycol dimethacrylate, 1,6-hexanediol dimethacrylate, neopentyl glycol diacrylate, ethylene glycol dimethacrylate, diethylene glycol diacrylate, diethylene glycol dimethacrylate, tetraethylene glycol diacrylate, tetraethylene glycol dimethacrylate, triethylene glycol diacrylate, triethylene glycol dimethacrylate, polyethylene glycol diacrylate, polyethylene glycol dimethacrylate, dipropylene glycol diacrylate, ethoxylated neopentyl glycol diacrylate, trimethylolpropane triacrylate, trimethylolpropane trimethacrylate, pentaerythritol triacrylate, pentaerythritol trimethacrylate, pentaerythritol tetramethacrylate, pentaerythritol tetraacrylate, ethoxylated triacrylate, tris(2-hydroxyethyl) isocyanurate triacrylate, dipentaerythritol pentaacrylate, ditrimethylolpropane tetraacrylate, alkoxylated tetraacrylate, or the like, and preferably, pentaerythritol triacrylate, pentaerythritol trimethacrylate, pentaerythritol tetramethacrylate, pentaerythritol tetraacrylate, etc. One or mixtures of two or more types thereof may be used.

Specific examples of the vinyl monomer include n-vinylpyrrolidone, n-vinyl-caprolactam, n-vinyl-imidazole, n-vinyl-n-methylacetamide, ethyl vinyl ether, n-butyl vinyl ether, iso-butyl vinyl ether, tert-butyl vinyl ether, cyclohexyl vinyl ether, 2-ethylhexyl vinyl ether, dodecyl vinyl ether, octadecyl vinyl ether, 1,4-butanediol divinyl ether, diethyleneglycol divinyl ether, triethyleneglycol divinyl ether, 1,4-cyclohexanedimethanol divinyl ether, hydroxybutyl vinyl ether, 1,4-cyclohexanedimethanol mono vinyl ether, 1,2,4-trivinylcyclohexane, vinylphosphonic acid, vinylphosphonic acid dimethyl ester, etc. One or mixtures of two or more types thereof may be used.

Specific examples of the epoxy monomer include glycidyl methacrylate, glycidyl acrylate ester, glycidyl methacrylate ester, α-ethyl acrylate glycidyl ester, α-n-propyl acrylate glycidyl ester, α-n-butyl acrylate glycidyl ester, acrylate-3,4-epoxy-butyl ester, methacrylate-3,4-epoxy-butyl ester, acrylate-6,7-epoxy-heptyl ester, methacrylate-6,7-epoxy-heptyl ester, α-ethyl acrylate-6,7-epoxy-heptyl ester, o-vinyl benzyl glycidyl ether, m-vinyl benzyl glycidyl ether, p-vinyl benzyl glycidyl ether, 3,3-dimethyl oxetane, 3,3-(hydroxymethyl) methyl oxetane, 3,3-(nitratomethyl) methyl oxetane, 3,3-bis(hydroxymethyl) oxetane, 3,3-bis(chloromethyl) oxetane, 3,3-(azidomethyl) methyl oxetane, 3,3-bis (azidomethyl) oxetane, 3-methyl nitroaminomethyl-oxetane, 3,3-bis(methyl nitraminomethyl) oxetane, 3,3-(difluoro aminomethyl) methyl oxetane, 3,3-bis(difluoro aminomethyl) oxetane, 3-hydroxy-oxetane, dioxetanyl ether, (bis[1-ethyl(3-oxetanyl)]methyl ether), etc. One or mixtures of two or more types thereof may be used.

The content of the reactive monomer according to the embodiment of the present invention is not particularly limited, and for example, may be included at 1 to 70 wt/o based on the total weight of the composition. When the content of the reactive monomer is less than 1 wt %, the effect of improving viscosity is low, and thus coatability may be deteriorated. When the content of the reactive monomer is more than 70 wt %, the contents of the resin and oligomer relatively decrease, and thus high hardness is difficult to be implemented.

The composition for forming a hard coating layer according to the embodiment of the present invention further includes a polymerization initiator.

Examples of the polymerization initiator include a photo-radical polymerization initiator, a photo-cationic polymerization initiator, a thermal polymerization initiator or the like which are usually used. One or mixtures of two or more types thereof may be used.

Examples of the photo-radical polymerization initiator include 1-hydroxycyclohexyl phenyl ketone, 2,2-dimethoxy-2-phenyl acetophenone, xanthone, fluorene, fluorenone, benzaldehyde, anthraquinone, triphenylamine, carbazole, 3-methyl-acetophenone, 4-chloro-benzophenone, 4,4'-dimethoxy benzophenone, 4,4'-diamino benzophenone, Mihira ketone, benzoyl propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethyl thioxanthone, 2-isopropyl thioxanthone, 2-chloro thioxanthone, 2-methyl-1-[4-(methylthio)phenyl]-2-morpholinopropan-1-one, 2,4,6-trimethylbenzoyl diphenylphosphine oxide, 2-benzyl-1-dimethylamino-1-(4-morpholinophenyl)butan-1-one, 1-[4-(2-hydroxyethoxy)-phenyl]-2-hydroxy-2-methylpropan-1-one, etc.

Examples of the photo-cationic polymerization initiator include an onium salt and/or an organometallic salt, or the like, but are not limited thereto. For example, a diaryl iodonium salt, a triaryl sulfonium salt, an aryl diazonium salt, an iron-arene complex or the like may be used.

More specifically, examples of the photo-cationic polymerization initiator include an aryl sulfonium hexafluoroantimonate salt, an aryl sulfonium hexafluorophosphate salt, a diphenyliodonium hexafluoroantimonate salt, a diphenyliodonium hexafluorophosphate salt, a ditolyliodonium hexafluorophosphate salt, a 9-(4-hydroxyethoxy phenyl)thianthrenium hexafluorophosphate salt, or the like, and the antimonate salt may cause an environmental issue, and thus hexafluorophosphate salt-based initiator may be preferably used. One or mixtures of two or more types thereof may be used.

Examples of the thermal polymerization initiator include a 3-methyl-2-butenyl tetramethylene sulfonium hexafluoroantimonate salt, an ytterbium trifluoromethenesulfonate salt, a samarium trifluoromethenesulfonate salt, an erbium trifluoromethenesulfonate salt, a dysprosium trifluoromethenesulfonate salt, a lanthanum trifluoromethenesulfonate salt, a tetrabutylphosphonium methenesulfonate salt, an ethyltriphenylphosphonium bromide salt, benzyldimethylamine, dimethylaminomethylphenol, triethanolamine, N-n-butylimidazole, 2-ethyl-4-methylimidazole, etc. One or mixtures of two or more types thereof may be used.

As necessary, the composition for forming a hard coating layer according to the embodiment of the present invention may further include an inorganic filler to improve hardness.

The inorganic filler is not particularly limited, and examples of the inorganic filler include metal oxides such as silica, alumina, titanium oxide or the like; hydroxides such as aluminum hydroxide, magnesium hydroxide, potassium hydroxide or the like; metal particles such as gold, silver, copper, nickel, alloys thereof or the like; conductive particles such as carbon, carbon nanotube, fullerene or the like; glass; ceramic or the like, and preferably, the inorganic filler may be silica. One or mixtures of two or more types thereof may be used.

The diameter of the inorganic filler is not particularly limited, and for example, may be in the range of 1 to 100 nm. When the average diameter is less than 1 nm, the effect of improving hardness is low, and when the average diameter is more than 100 nm, transmittance may decrease. Preferably, the average diameter may be in the range of 10 to 50 nm.

The content of the reactive monomer according to the embodiment of the present invention is not particularly limited, and for example, may be included at 0.1 to 20 wt % based on the total weight of the composition. When the content of the inorganic filler is less than 0.1 wt %, the effect of improving hardness is low, and when the content of the inorganic filler is more than 10 wt %, viscosity may increase, and thus coatability may decrease.

As necessary, the composition for forming a hard coating layer according to the embodiment of the present invention may further include a lubricant to improve winding efficiency, blocking resistance, abrasion resistance, and scratch resistance.

The type of the lubricant according to the embodiment of the present invention is not particularly limited, and examples of the lubricant include waxes such as a polyethylene wax, a paraffin wax, a synthetic wax, a montan wax or the like; synthetic resins such as a silicone-based resin, a fluorine-based resin, etc. One or mixtures of two or more types thereof may be used.

The content of the lubricant according to the embodiment of the present invention is not particularly limited, and for example, may be included at 0.1 to 10 wt % based on the total weight of the composition. When the content of the lubricant is in the above-described range, excellent blocking resistance, abrasion resistance and scratch resistance may be provided, and satisfactory transparency may also be maintained.

As necessary, the composition for forming a hard coating layer according to the embodiment of the present invention may further include a solvent.

The solvent according to the embodiment of the present invention is not particularly limited and a solvent known in the related field may be used. Examples of the solvent include alcohols such as methanol, ethanol, isopropanol, butanol, methyl cellosolve, ethyl cellosolve or the like, ketones such as methyl ethyl ketone, methyl butyl ketone, methyl isobutyl ketone, diethyl ketone, dipropyl ketone, cyclohexanone or the like, hexanes such as hexane, heptane, octane, or the like, benzenes such as benzene, toluene, xylene, etc. One or mixtures of two or more types thereof may be used.

The content of the solvent according to the embodiment of the present invention is not particularly limited, and for example, may be included at 0 to 60 parts by weight based on 100 parts by weight of the solid content of the composition. When the content is more than 60 parts by weight, the time of the curing process is prolonged, resulting in low economic efficiency.

In addition, additives such as antioxidants, UV absorbers, light stabilizers, thermal polymerization inhibitors, leveling agents, surfactants, lubricants, antifouling agents or the like may be further included as necessary.

Hard Coating Film

Further, the present invention provides a hard coating film 100 including a base material 110 of which at least one surface has a hard coating layer 120 formed of the composition for forming a hard coating layer.

Preferably, the base material 110 according to the embodiment of the present invention has excellent transparency, mechanical strength, thermal stability, water blocking properties, isotropy, etc. Examples of the base material 110 include base materials made from polyester resins such as polyethylene terephthalate, polyethylene isophthalate, polybutylene terephthalate or the like; cellulose resins such as diacetyl cellulose, triacetyl cellulose or the like; polycarbonate resins; acrylic resins such as polymethyl (meth)acrylate, polyethyl (meth)acrylate or the like; styrene resins such as polystyrene, an acrylonitrile-styrene copolymer or the like; polyolefin resins such as polyethylene, polypropylene, a polyolefin-based resin having a cyclo or norbornene structure, an ethylene-propylene copolymer or the like; polyimide resins; polyether sulfone resins; sulfone resins, etc.

The thickness of the base material 110 is not particularly limited, and for example, may be in the range of 10 to 300 μm.

The hard coating layer 120 is formed by coating with the composition for forming a hard coating layer and curing, and coating may be performed using well-known methods such as a die coater method, an air knife method, a reverse roll method, a spraying method, a blade method, a casting method, a gravure method, a spin coating method, etc.

The thickness of the hard coating layer 120 is not particularly limited, and for example, may be in the range of 10 to 100 μm. When the thickness of the hard coating layer 120 is in the above-described range, a curling phenomenon hardly occurs, and the hard coating layer 120 having excellent hardness may be obtained.

The hard coating layer 120 according to the embodiment of the present invention is formed of the composition for forming a hard coating layer, and thus has significantly improved hardness. Although hardness may vary depending on the content, type or the like of each composition, the pencil hardness of the hard coating layer 120 may be 5H or more, and when each of the above-described composition is mixed at a desired content, the maximum pencil hardness of the hard coating layer 120 may be 9H or more.

Moreover, flexibility is notably enhanced, and thus curling is reduced.

Figure 2:
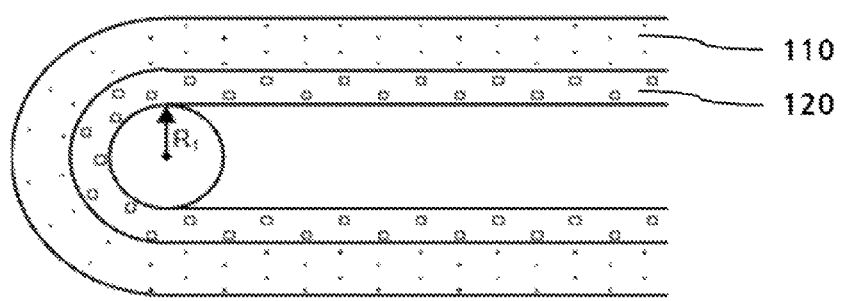
FIG. 2 schematically illustrates an embodiment of performing a bending test for a hard coating film including a hard coating layer formed of a composition for forming a hard coating layer according to the embodiment of the present invention.

More specifically, as shown in FIG. 2, when the hard coating film is wound at an angle of 180° on a cylinder having a bottom radius $R_1$ in a manner in which the hard coating layer is positioned at an inner side, went back to the original position, and then was observed with the naked eye, if the hard coating layer 120 has low flexibility, a trace of fold, stains, whitening, cracks or the like may be formed on the hard coating layer. However, since the hard coating layer 120 according to the embodiment of the present invention has excellent flexibility, even when $R_1$ is in the range of 1 to 5 mm, no deformation such as cracks or the like occurs.

Figure 3:
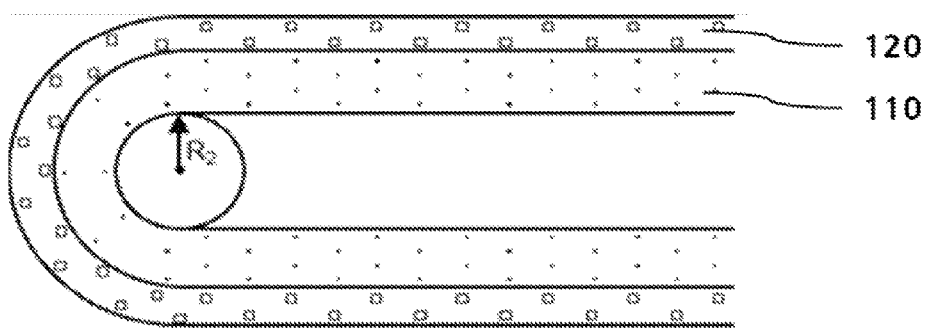
FIG. 3 schematically illustrates an embodiment of performing a bending test for a hard coating film including a hard coating layer formed of a composition for forming a hard coating layer according to the embodiment of the present invention.
Figure 4:
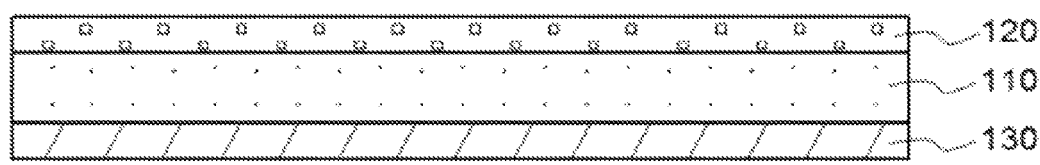
FIG. 4 is a schematic cross-sectional view of a hard coating film including a hard coating layer on one surface and an anti-curl back coating layer on another surface according to the embodiment of the present invention.

On the other hand, as shown in FIG. 3, when the hard coating film is wound at an angle of 180° on a cylinder having a bottom radius $R_2$ in a manner in which the hard coating layer is positioned at an outer side, went back to the original position, and then was observed with the naked eye, even $R_2$ is in the range of 5 to 30 mm, no deformation such as cracks or the like occurs on the hard coating layer 120 according to the embodiment of the present invention.

When the hard coating layer 120 is formed on one surface of the base material 110 according to the embodiment of the present invention, the base material 110 according to the embodiment of the present invention may further include an anti-curl back coating layer 130 formed on another surface thereof so as to further enhance flexibility and minimize curling.

The anti-curl back coating layer 130 may be formed by applying the composition for forming the anti-curl back coating layer which are well known in the related field, and curing the composition. For example, the same composition as that of the above-described hard coating layer may be used, or the anti-curl back coating layer or the composition for forming a hard coating layer including an acrylic resin, an acrylic oligomer, an acrylic monomer, a polymerization initiator or the like, which is well known in the related field may be used.

The thickness of the anti-curl back coating layer is not particularly limited, and for example, may be in the range of 30 to 200 μm.

Figure 5:
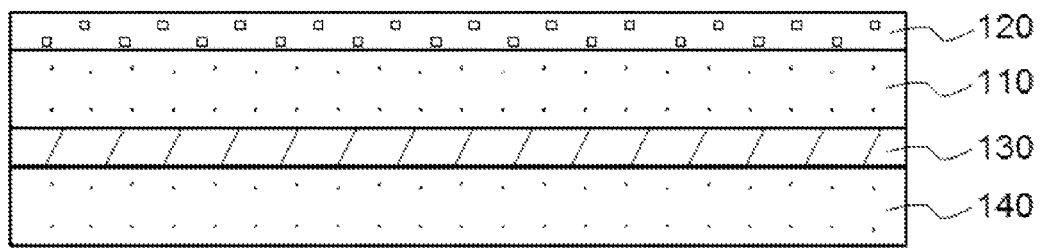
FIG. 5 is a schematic cross-sectional view of a hard coating film including a hard coating layer on one surface, an anti-curl back coating layer on another surface and a crack-preventing layer on a lowermost surface according to the embodiment of the present invention.

Furthermore, when the anti-curl back coating layer 130 is formed on one surface of the hard coating layer 120 according to the embodiment of the present invention, as shown in FIG. 5, the base material 110 according to the embodiment of the present invention may further include a crack-preventing layer 140 formed on the anti-curl back coating layer 130 so as to further enhance the flexibility of the anti-curl back coating layer 130. In this case, one surface of the anti-curl back coating layer 130 may abut the hard coating layer 120, and another surface thereof may abut the crack-preventing layer 140.

When the crack-preventing layer 140 is used, the effect of suppressing deformation such as cracks which may occur on the anti-curl back coating layer 130 during bending in a direction of $R_1$ may be expected.

Preferably, the crack-preventing layer 140 according to the embodiment of the present invention has excellent transparency, mechanical strength, thermal stability, water blocking properties, isotropy, etc. Examples of the crack-preventing layer 140 include base materials made from polyester resins such as polyethylene terephthalate, polyethylene isophthalate, polybutylene terephthalate or the like; cellulose resins such as diacetyl cellulose, triacetyl cellulose or the like; polycarbonate resins; acrylic resins such as polymethyl (meth)acrylate, polyethyl (meth)acrylate or the like; styrene resins such as polystyrene, an acrylonitrile-styrene copolymer or the like; polyolefin resins such as polyethylene, polypropylene, a polyolefin-based resin having a cyclo or norbornene structure, an ethylene-propylene copolymer or the like; polyimide resins; polyether sulfone resins; sulfone resins, etc.

The thickness of the crack-preventing layer 140 is not particularly limited, and for example, may be in the range of 5 to 100 μm.

The crack-preventing layer 140 may function to suppress curling of the hard coating layer, and also has an additional effect of improving impact resistance, etc.

The hard coating film according to the embodiment of the present invention includes the hard coating layer having high surface hardness and excellent flexibility, and thus is lighter and has excellent impact resistance as compared to tempered glass. Accordingly, the hard coating film 100 may be preferably used as a window cover at the outermost surface of a display panel.

Furthermore, the present invention provides an image display device including the hard coating film.

The hard coating film may be used as a window cover at the outermost surface of the display panel, and the image display device may include various image display devices which are usually used, such as a liquid crystal display device, an electroluminescence display device, a plasma display device, a field emission display device, etc.

Hereinafter, the present invention will be described in detail in conjunction with the examples.

Preparation Example 1 Synthesis of Silsesquioxane Resin (A1)

3-(methacryloyloxy)propyltrimethoxysilane (MAPTMS, manufactured by Tokyo Chemical Industry Co., Ltd.), phenyl trimethoxysilane (PTMS, manufactured by Sigma-Aldrich Corporation) and water ($H_2O$, manufactured by Sigma-Aldrich Corporation) were mixed at a ratio of 14.91 g:9.62 g:2.70 g (0.06 mol:0.04 mol:0.15 mol), and then put into a 100 ml 2-neck flask. Thereafter, 1 g of Amberlyst IRA-400(Cl) as a catalyst was added to the mixture, and stirred at 80° C. for 24 hours. Then, the mixture was filtered using a 0.45 μm Teflon filter, and thereby an acrylic siloxane resin was obtained. The molecular weight of the resin was measured using gel permeation chromatography (GPC), and the measured weight average molecular weight was 5,000.

Preparation Example 2 Synthesis of Silsesquioxane Resin (A2)

3-(methacryloyloxy)propyltrimethoxysilane (MAPTMS, manufactured by Tokyo Chemical Industry Co., Ltd.), phenyl trimethoxysilane (PTMS, manufactured by Sigma-Aldrich Corporation) and water ($H_2O$, manufactured by Sigma-Aldrich Corporation) were mixed at a ratio of 14.91 g:9.62 g:2.70 g (0.06 mol:0.04 mol:0.15 mol), and then put into a 100 ml 2-neck flask. Thereafter, 0.5 g of Amberlyst IRA-400(Cl) as a catalyst was added to the mixture, and stirred at 80° C. for 48 hours. Then, the mixture was filtered using a 0.45 μm Teflon filter, and thereby an acrylic siloxane resin was obtained. The molecular weight of the resin was measured using gel permeation chromatography (GPC), and the measured weight average molecular weight was 10,000.

Preparation Example 3 Synthesis of Silsesquioxane Resin (A3)

3-(methacryloyloxy)propyltrimethoxysilane (MAPTMS, manufactured by Tokyo Chemical Industry Co., Ltd.), phenyl trimethoxysilane (PTMS, manufactured by Sigma-Aldrich Corporation) and water ($H_2O$, manufactured by Sigma-Aldrich Corporation) were mixed at a ratio of 14.91 g:9.62 g:2.70 g (0.06 mol:0.04 mol:0.15 mol), and then put into a 250 ml 2-neck flask. Thereafter, 2 g of Amberlyst IRA-400(Cl) as a catalyst and 100 mL of methy ethyl ketone (MEK) were added to the mixture, and stirred at 25° C. for 24 hours. Then, the mixture was filtered using a 0.45 μm Teflon filter, and thereby an acrylic siloxane resin was obtained. The molecular weight of the resin was measured using gel permeation chromatography (GPC), and the measured weight average molecular weight was 1,000.

Preparation Example 4 Synthesis of Silsesquioxane Resin (A4)

3-(methacryloyloxy)propyltrimethoxysilane (MAPTMS, manufactured by Tokyo Chemical Industry Co., Ltd.) and water ($H_2O$, manufactured by Sigma-Aldrich Corporation) were mixed at a ratio of 24.84 g:2.70 g (0.1 mol:0.15 mol), and then put into a 100 ml 2-neck flask. Thereafter, 0.5 g of Amberlyst IRA-400(Cl) as a catalyst was added to the mixture, and stirred at 80° C. for 60 hours. Then, the mixture was filtered using a 0.45 μm Teflon filter, and thereby an acrylic siloxane resin was obtained. The molecular weight of the resin was measured using gel permeation chromatography (GPC), and the measured weight average molecular weight was 10,000.

Preparation Example 5 Synthesis of Silsesquioxane Resin (A5)

3-(methacryloyloxy)propyltrimethoxysilane (MAPTMS, manufactured by Tokyo Chemical Industry Co., Ltd.) and water ($H_2O$, manufactured by Sigma-Aldrich Corporation) were mixed at a ratio of 24.84 g:2.70 g (0.1 mol:0.15 mol), and then put into a 100 ml 2-neck flask. Thereafter, 0.2 g of Amberlyst IRA-400(Cl) as a catalyst was added to the mixture, and stirred at 80° C. for 72 hours. Then, the mixture was filtered using a 0.45 μm Teflon filter, and thereby an acrylic siloxane resin was obtained. The molecular weight of the resin was measured using gel permeation chromatography (GPC), and the measured weight average molecular weight was 13,000.

Preparation Example 6 Synthesis of Silsesquioxane Resin (A6)

3-(methacryloyloxy)propyltrimethoxysilane (MAPTMS, manufactured by Tokyo Chemical Industry Co., Ltd.) and water ($H_2O$, manufactured by Sigma-Aldrich Corporation) were mixed at a ratio of 24.84 g:2.70 g (0.1 mol:0.15 mol), and then put into a 100 ml 2-neck flask. Thereafter, 1 g of Amberlyst IRA-400(Cl) as a catalyst was added to the mixture, and stirred at 80° C. for 24 hours. Then, the mixture was filtered using a 0.45 μm Teflon filter, and thereby an acrylic siloxane resin was obtained. The molecular weight of the resin was measured using gel permeation chromatography (GPC), and the measured weight average molecular weight was 5,000.

Preparation Example 7 Synthesis of Silsesquioxane Resin (A7)

3-(methacryloyloxy)propyltrimethoxysilane (MAPTMS, manufactured by Tokyo Chemical Industry Co., Ltd.) and water ($H_2O$, manufactured by Sigma-Aldrich Corporation) were mixed at a ratio of 24.84 g:2.70 g (0.1 mol:0.15 mol), and then put into a 100 ml 2-neck flask. Thereafter, 1 g of Amberlyst IRA-400(Cl) as a catalyst and 50 mL of MEK were added to the mixture, and stirred at 80° C. for 36 hours. Then, the mixture was filtered using a 0.45 μm Teflon filter, and thereby an acrylic siloxane resin was obtained. The molecular weight of the resin was measured using gel permeation chromatography (GPC), and the measured weight average molecular weight was 4,000.

Preparation Example 8 Synthesis of Silsesquioxane Resin (A8)

3-(methacryloyloxy)propyltrimethoxysilane (MAPTMS, manufactured by Tokyo Chemical Industry Co., Ltd.), phenyl trimethoxysilane (PTMS, manufactured by Sigma-Aldrich Corporation) and water ($H_2O$, manufactured by Sigma-Aldrich Corporation) were mixed at a ratio of 9.94 g:14.42 g:2.70 g (0.04 mol:0.06 mol:0.15 mol), and then put into a 250 ml 2-neck flask. Thereafter, 1 g of Amberlyst IRA-400(Cl) as a catalyst was added to the mixture, and stirred at 80° C. for 24 hours. Then, the mixture was filtered using a 0.45 μm Teflon filter, and thereby an acrylic siloxane resin was obtained. The molecular weight of the resin was measured using gel permeation chromatography (GPC), and the measured weight average molecular weight was 5,000.

Preparation Example 9 Synthesis of Silsesquioxane Resin (A9)

3-(methacryloyloxy)propyltrimethoxysilane (MAPTMS, manufactured by Tokyo Chemical Industry Co., Ltd.), phenyl trimethoxysilane (PTMS, manufactured by Sigma-Aldrich Corporation) and water ($H_2O$, manufactured by Sigma-Aldrich Corporation) were mixed at a ratio of 9.94 g:14.42 g:2.70 g (0.04 mol:0.06 mol:0.15 mol), and then put into a 250 ml 2-neck flask. Thereafter, 0.5 g of Amberlyst IRA-400(Cl) as a catalyst was added to the mixture, and stirred at 80° C. for 48 hours. Then, the mixture was filtered using a 0.45 μm Teflon filter, and thereby an acrylic siloxane resin was obtained. The molecular weight of the resin was measured using gel permeation chromatography (GPC), and the measured weight average molecular weight was 10,000.

Preparation Example 10 Synthesis of Silsesquioxane Resin (A10)

3-(methacryloyloxy)propyltrimethoxysilane (MAPTMS, manufactured by Tokyo Chemical Industry Co., Ltd.), phenyl trimethoxysilane (PTMS, manufactured by Sigma-Aldrich Corporation) and water ($H_2O$, manufactured by Sigma-Aldrich Corporation) were mixed at a ratio of 9.94 g:14.42 g:2.70 g (0.04 mol:0.06 mol:0.15 mol), and then put into a 250 ml 2-neck flask. Thereafter, 2 g of Amberlyst IRA-400(Cl) as a catalyst and 100 mL of MEK were added to the mixture, and stirred at 25° C. for 24 hours. Then, the mixture was filtered using a 0.45 μm Teflon filter, and thereby an acrylic c siloxane resin was obtained. The molecular weight of the resin was measured using gel permeation chromatography (GPC), and the measured weight average molecular weight was 1,000.

Preparation Example 11 Synthesis of Silsesquioxane Resin (A11)

3-(methacryloyloxy)propyltrimethoxysilane (MAPTMS, manufactured by Tokyo Chemical Industry Co., Ltd.), phenyl trimethoxysilane (PTMS, manufactured by Sigma-Aldrich Corporation) and water ($H_2O$, manufactured by Sigma-Aldrich Corporation) were mixed at a ratio of 14.91 g:9.62 g:2.70 g (0.06 mol:0.04 mol:0.15 mol), and then put into a 250 ml 2-neck flask. Thereafter, 1 g of Amberlyst IRA-400(Cl) as a catalyst and 50 mL of MEK were added to the mixture, and stirred at 25° C. for 12 hours. Then, the mixture was filtered using a 0.45 μm Teflon filter, and thereby an acrylic siloxane resin was obtained. The molecular weight of the resin was measured using gel permeation chromatography (GPC), and the measured weight average molecular weight was 500.

Preparation Example 12 Synthesis of Silsesquioxane Resin (A12)

3-(methacryloyloxy)propyltrimethoxysilane (MAPTMS, manufactured by Tokyo Chemical Industry Co., Ltd.) and water ($H_2O$, manufactured by Sigma-Aldrich Corporation) were mixed at a ratio of 24.84 g:2.70 g (0.1 mol:0.15 mol), and then put into a 250 ml 2-neck flask. Thereafter, 1 g of Amberlyst IRA-400(Cl) as a catalyst and 50 mL of MEK were added to the mixture, and stirred at 70° C. for 24 hours. Then, the mixture was filtered using a 0.45 μm Teflon filter, and thereby an acrylic siloxane resin was obtained. The molecular weight of the resin was measured using gel permeation chromatography (GPC), and the measured weight average molecular weight was 2,000.

Preparation Example 13 Synthesis of Silsesquioxane Resin (A13)

3-(methacryloyloxy)propyltrimethoxysilane (MAPTMS, manufactured by Tokyo Chemical Industry Co., Ltd.) and water ($H_2O$, manufactured by Sigma-Aldrich Corporation) were mixed at a ratio of 24.84 g:2.70 g (0.1 mol:0.15 mol), and then put into a 250 ml 2-neck flask. Thereafter, 2 g of Amberlyst IRA-400(Cl) as a catalyst and 100 mL of MEK were added to the mixture, and stirred at 25° C. for 24 hours. Then, the mixture was filtered using a 0.45 μm Teflon filter, and thereby an acrylic siloxane resin was obtained. The molecular weight of the resin was measured using gel permeation chromatography (GPC), and the measured weight average molecular weight was 1,000.

Preparation Example 14 Synthesis of Silsesquioxane Resin (V1)

Vinyl trimethoxysilane (VTMS, manufactured by Sigma-Aldrich Corporation), phenyl trimethoxysilane (PTMS, manufactured by Sigma-Aldrich Corporation) and water ($H_2O$, manufactured by Sigma-Aldrich Corporation) were mixed at a ratio of 11.86 g:4.81 g:2.70 g (0.08 mol:0.02 mol:0.15 mol), and then put into a 250 ml 2-neck flask. Thereafter 1 g of 30% HCl as a catalyst was added to the mixture, and stirred at 25° C. for 24 hours. Then, the mixture was filtered using a 0.45 μm Teflon filter, and thereby a siloxane resin was obtained. The molecular weight of the resin was measured using gel permeation chromatography (GPC), and the measured weight average molecular weight was 2,000.

Preparation Example 15 Synthesis of Silsesquioxane Resin (V2)

Vinyl trimethoxysilane (VTMS, manufactured by Sigma-Aldrich Corporation), phenyl trimethoxysilane (PTMS, manufactured by Sigma-Aldrich Corporation) and water ($H_2O$, manufactured by Sigma-Aldrich Corporation) were mixed at a ratio of 11.86 g:4.81 g:2.70 g (0.08 mol:0.02 mol:0.15 mol), and then put into a 250 ml 2-neck flask. Thereafter, 1 g of 30% HCl as a catalyst was added to the mixture, and stirred at 80° C. for 24 hours. Then, the mixture was filtered using a 0.45 μm Teflon filter, and thereby a siloxane resin was obtained. The molecular weight of the resin was measured using gel permeation chromatography (GPC), and the measured weight average molecular weight was 5,000.

Preparation Example 16 Synthesis of Silsesquioxane Resin (E1)

2-(3,4-epoxycyclohexyl)ethyltrimethoxysilane (ECTMS, manufactured by Tokyo Chemical Industry Co., Ltd.), phenyl trimethoxysilane (PTMS, manufactured by Sigma-Aldrich Corporation) and water ($H_2O$, manufactured by Sigma-Aldrich Corporation) were mixed at a ratio of 19.71 g:4.81 g:2.70 g (0.08 mol:0.02 mol:0.15 mol), and then put into a 250 ml 2-neck flask. Thereafter, 0.1 ml of tetramethyl ammonium hydroxide as a catalyst and 100 mL of MEK were added to the mixture, and stirred at 60° C. for 36 hours. Then, the mixture was filtered using a 0.45 μm Teflon filter, and thereby an alicyclic epoxy siloxane resin was obtained. The molecular weight of the alicyclic epoxy siloxane resin was measured using gel permeation chromatography (GPC), and the measured weight average molecular weight was 2,000.

Preparation Example 17 Synthesis of Silsesquioxane Resin (E2)

2-(3,4-epoxycyclohexyl)ethyltrimethoxysilane (ECTMS, manufactured by Tokyo Chemical Industry Co., Ltd.), phenyl trimethoxysilane (PTMS, manufactured by Sigma-Aldrich Corporation) and water (H₂O, manufactured by Sigma-Aldrich Corporation) were mixed at a ratio of 19.71 g:4.81 g:2.70 g (0.08 mol:0.02 mol:0.15 mol), and then put into a 250 ml 2-neck flask. Thereafter, 0.1 ml of tetramethyl ammonium hydroxide as a catalyst and 50 mL of MEK were added to the mixture, and stirred at 80° C. for 24 hours. Then, the mixture was filtered using a 0.45 μm Teflon filter, and thereby an alicyclic epoxy siloxane resin was obtained. The molecular weight of the alicyclic epoxy siloxane resin was measured using gel permeation chromatography (GPC), and the measured weight average molecular weight was 5,000.

Examples and Comparative Examples

The compositions for forming a hard coating layer were prepared according to compositions and contents listed in the following Table 1.

In Table 1, the content of the silsesquioxane resin refers to the total content of the used silsesquioxane resin. When two types of the silsesquioxane resins were used together, as illustrated in FIGS. 5 to 17, the silsesquioxane resins with different mixing ratios were used.

TABLE 1

| | Silsesquioxane | | | | | | | | | |
|---|---|---|---|---|---|---|---|---|---|---|
| | First silsesquioxane resin | | | Second silsesquioxane resin | | | | Hydro- | Oligomer | |
| Classification | Component | Parts by weight | Equivalent ratio (%) | Component | Parts by weight | Equivalent ratio | Total content | dynamic radius ratio | Component | Parts by weight |
| Example 1 | A1 | 0~60 | 55 | A2 | 60~0 | 55 | 60 | 1.15 | SOU1020 | 5 |
| Example 2 | A1 | 0~60 | 55 | A3 | 60~0 | 55 | 60 | 2.00 | SOU1020 | 5 |
| Example 3 | A3 | 0~60 | 55 | A2 | 60~0 | 55 | 60 | 2.90 | SOU1020 | 5 |
| Example 4 | A4 | 0~60 | 89 | A5 | 60~0 | 89 | 60 | 1.01 | SOU1020 | 5 |
| Example 5 | A6 | 0~60 | 89 | A4 | 60~0 | 89 | 60 | 1.15 | SOU1020 | 5 |
| Example 6 | A7 | 0~60 | 89 | A4 | 60~0 | 89 | 60 | 1.45 | SOU1020 | 5 |
| Example 7 | A4 | 0~60 | 89 | A5 | 60~0 | 89 | 60 | 1.01 | SOU1020 | 5 |
| Example 8 | V1 | 0~70 | 55 | V2 | 70~0 | 55 | 70 | 1.55 | — | — |
| Example 9 | E1 | 0~70 | 55 | E2 | 70~0 | 55 | 70 | 1.40 | — | — |
| Example 10 | A12 | 0~60 | 89 | A6 | 60~0 | 89 | 60 | 1.60 | SOU1020 | 5 |
| Example 11 | A13 | 0~60 | 89 | A6 | 60~0 | 89 | 60 | 2.0 | SOU1020 | 5 |
| Comparative Example 1 | A8 | 0~60 | 35 | A9 | 60~0 | 35 | 60 | 1.15 | SOU1020 | 5 |
| Comparative Example 2 | A10 | 0~60 | 35 | A8 | 60~0 | 35 | 60 | 2.00 | SOU1020 | 5 |
| Comparative Example 3 | A10 | 0~60 | 35 | A9 | 60~0 | 35 | 60 | 2.90 | SOU1020 | 5 |
| Comparative Example 4 | A10 | 0~60 | 55 | A6 | 60~0 | 89 | 60 | 3.10 | SOU1020 | 5 |
| Comparative Example 5 | A11 | 0~60 | 55 | A4 | 60~0 | 89 | 60 | 3.50 | SOU1020 | 5 |

| | Monomer | | Polymerization initiator | | Solvent | |
|---|---|---|---|---|---|---|
| Classification | Component | Parts by weight | Component | Parts by weight | Component | Parts by weight |
| Example 1 | M410 | 30 | TPO | 5 | — | — |
| Example 2 | M410 | 30 | TPO | 5 | — | — |
| Example 3 | M410 | 30 | TPO | 5 | — | — |
| Example 4 | M410 | 30 | TPO | 5 | — | — |
| Example 5 | M410 | 30 | TPO | 5 | — | — |
| Example 6 | M410 | 30 | TPO | 5 | — | — |
| Example 7 | M410 | 30 | TPO | 5 | MEK | 30 |

TABLE 1-continued

| | | | | | | |
|---|---|---|---|---|---|---|
| Example 8 | — | — | Irgacure 250 | 4 | MEK | 26 |
| Example 9 | — | — | Irgacure 250 | 4 | MEK | 26 |
| Example 10 | M410 | 30 | TPO | 5 | — | — |
| Example 11 | M410 | 30 | TPO | 5 | — | — |
| Comparative Example 1 | M410 | 30 | TPO | 5 | — | — |
| Comparative Example 2 | M410 | 30 | TPO | 5 | — | — |
| Comparative Example 3 | M410 | 30 | TPO | 5 | — | — |
| Comparative Example 4 | M410 | 30 | TPO | 5 | — | — |
| Comparative Example 5 | M410 | 30 | TPO | 5 | — | — |

SOU1020: aliphatic urethane acrylate, SHIN-A T&C,
M410: Ditrimethylolpropane Tetraacrylate, Miwon Specialty Chemical Co., Ltd.
Lucirin EPO: 2,4,6-Trimethylbenzoyldiphenylphosphine oxide, BASF
Irgacure 250, BASF
MEK: Methyl ethyl ketone Experimental Example The compositions for forming a hard coating layer prepared in the examples and comparative examples were applied onto a base material which is polyethylene terephthalate having a thickness of 125 μm such that a coating layer has a thickness of about 50 μm, was cured under conditions of 300 mW/cm and 1.2 J/cm² using a metal halide lamp having a wavelength of 365 nm, and thereby a hard coating layer was formed.

In Examples 7 to 9, the drying process was performed at 60° C. for 5 minutes after applying the composition. In Examples 8 and 9, the post-baking process was performed at 100° C. for 10 minutes after curing the composition.

(1) Measurement of Pencil Hardness

A 50 mm-long line was drawn five times on the hard coating film made from the composition of the examples and comparative examples at a rate of 3 mm/sec under a load of 1.0 kg according to JISK5400, after which pencil hardness was measured based on the case in which scratches occurred twice or more.

(2) Evaluation of Flexibility

The hard coating film made from the composition of examples and comparative examples was wound at an angle of 180° on a cylinder having a bottom radius $R_1$ in a manner in which the hard coating layer is positioned at an inner side, and went back to the original position. Thereafter, the minimum $R_1$ of the cylinder in which the bending deformation such as a trace of fold, stains, whitening, cracks or the like of the hard coating layer was not observed was reported. Then, the hard coating film made from the composition of examples and comparative examples was wound at an angle of 180° on a cylinder having a bottom radius $R_2$ in a manner in which the hard coating layer is positioned at an outer side, went back to the original position, and the minimum $R_2$ of the cylinder in which the bending deformation of the hard coating layer was not observed was reported.

Figure 6:
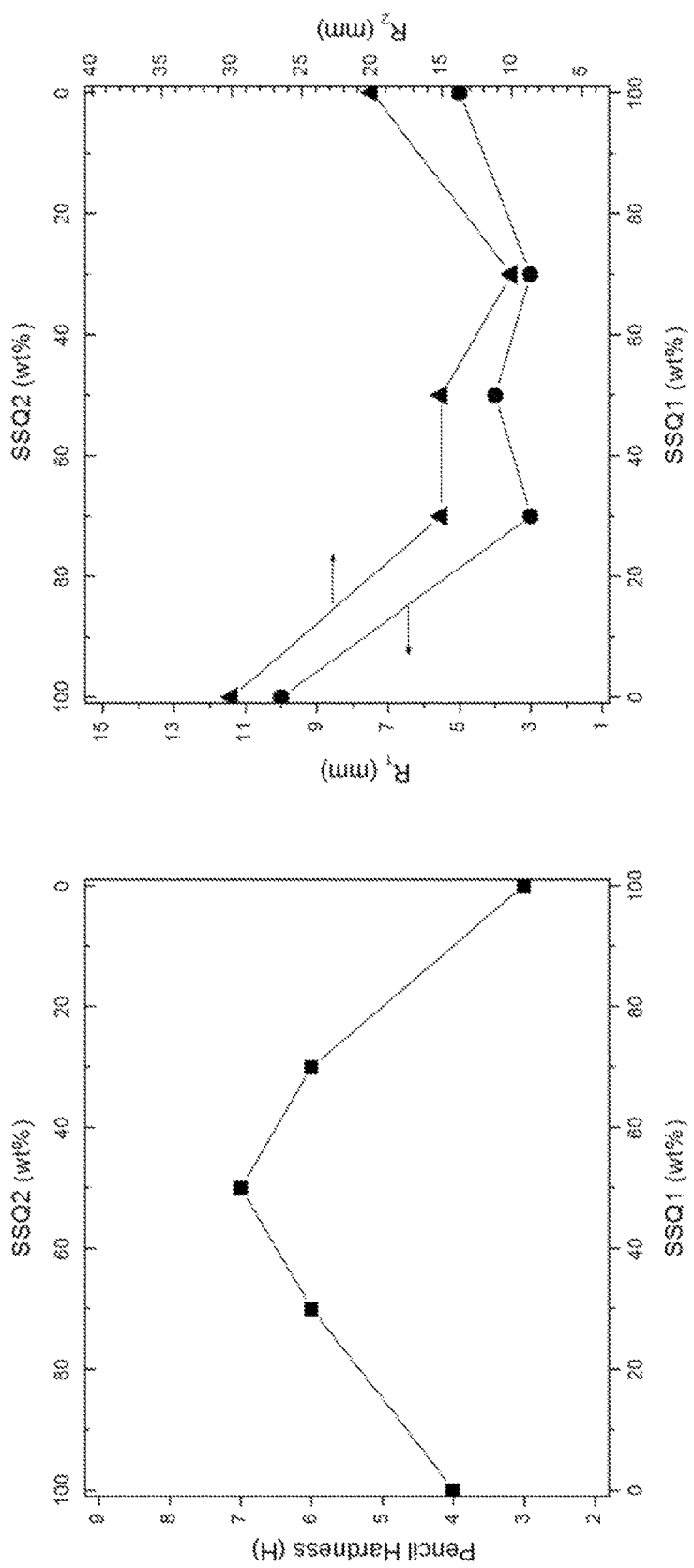
FIG. 6 shows a result of pencil hardness and flexibility evaluation according to a mixing ratio of first and second silsesquioxane resins of a hard coating layer formed of the composition of Example 1.
Figure 7:
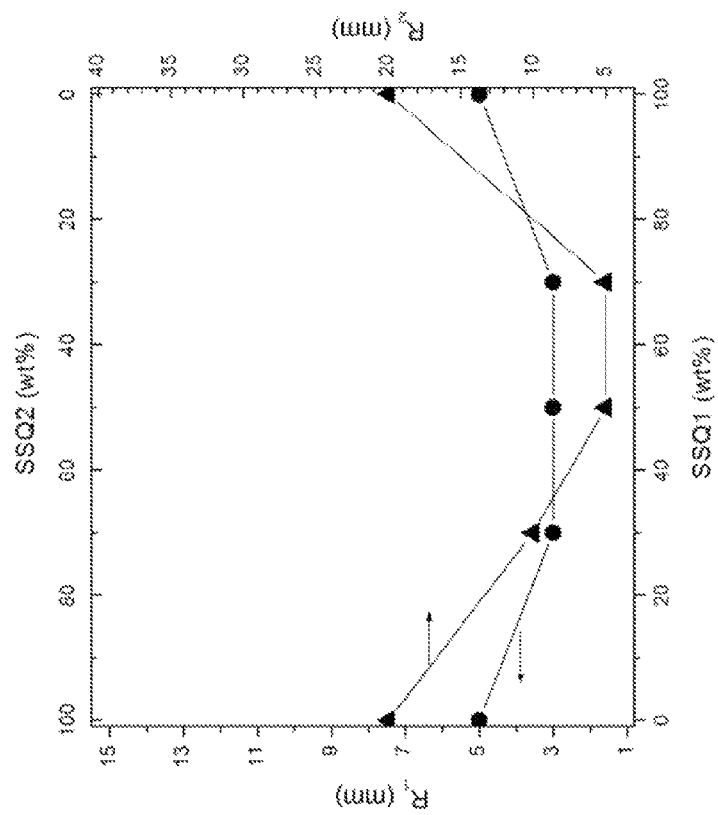
FIG. 7 shows a result of pencil hardness and flexibility evaluation according to a mixing ratio of the first and second silsesquioxane resins of a hard coating layer formed of the composition of Example 2.
Figure 7:
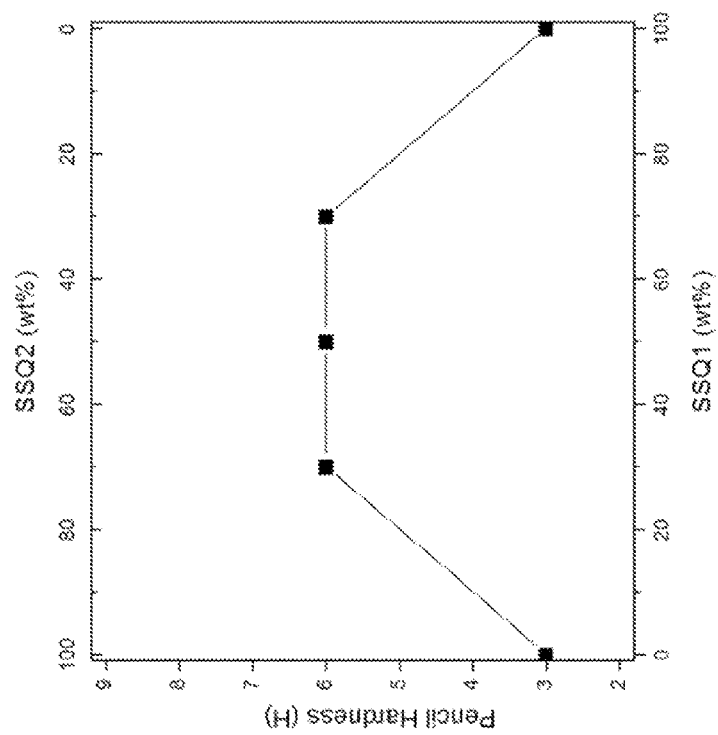
Figure 8:
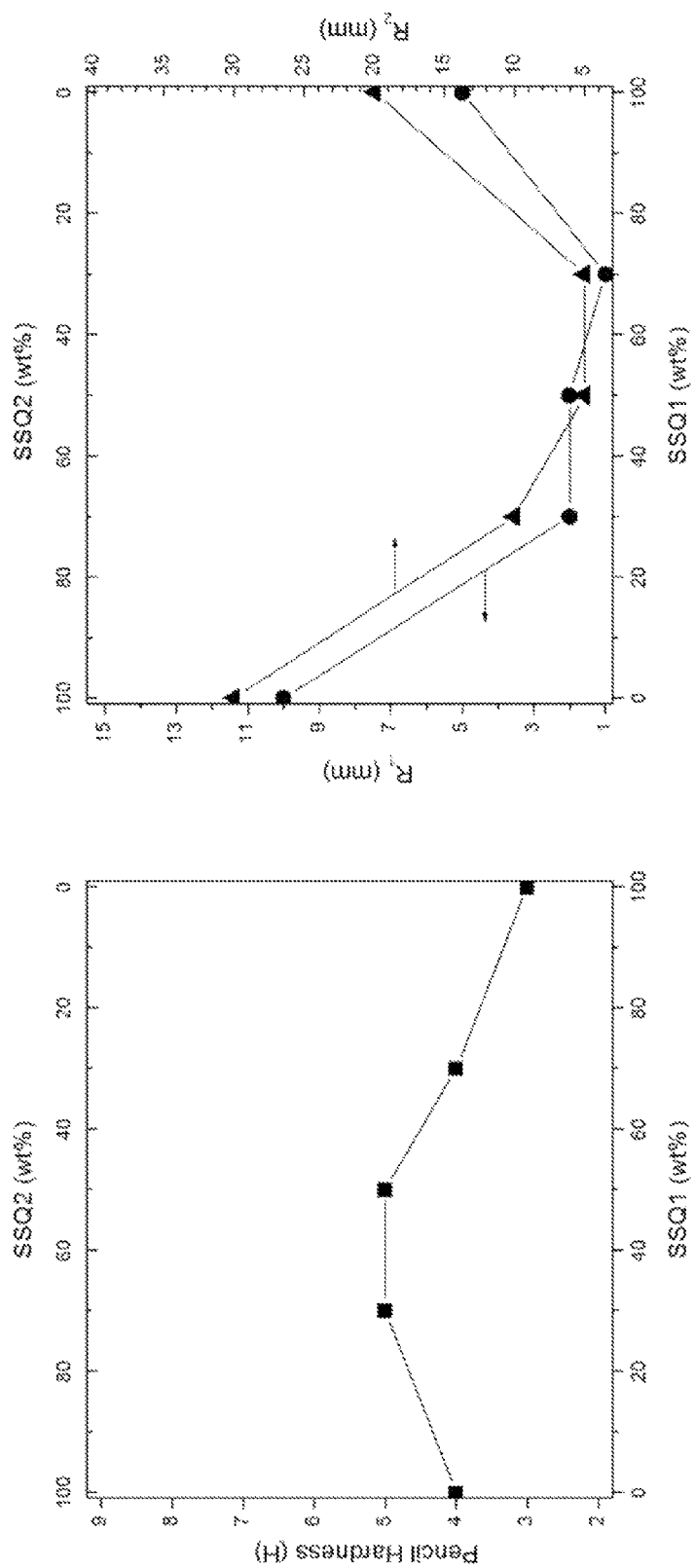
FIG. 8 shows a result of pencil hardness and flexibility evaluation according to a mixing ratio of the first and second silsesquioxane resins of a hard coating layer formed of the composition of Example 3.
Figure 9:
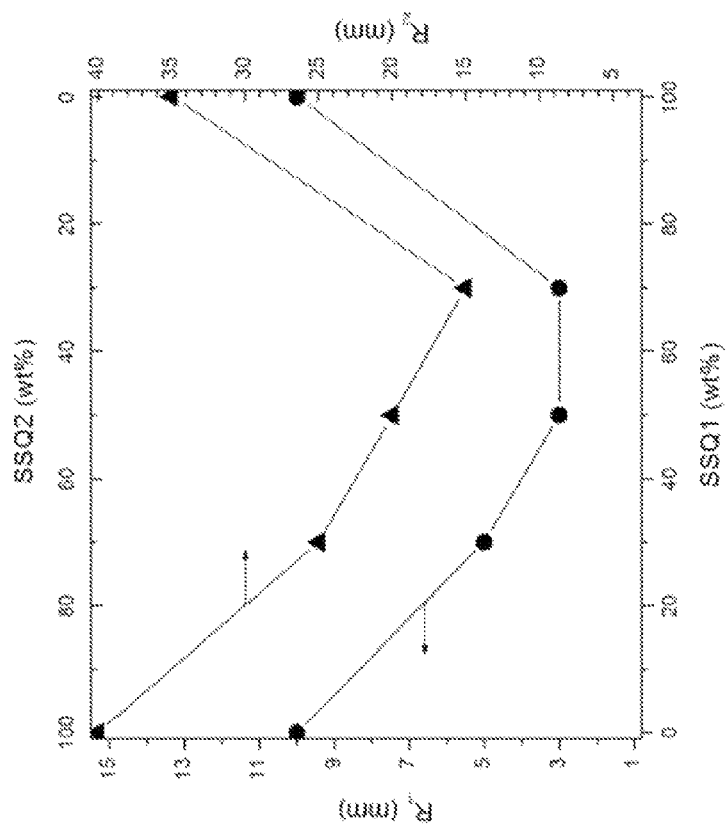
FIG. 9 shows a result of pencil hardness and flexibility evaluation according to a mixing ratio of the first and second silsesquioxane resins of a hard coating layer formed of the composition of Example 4.
Figure 9:
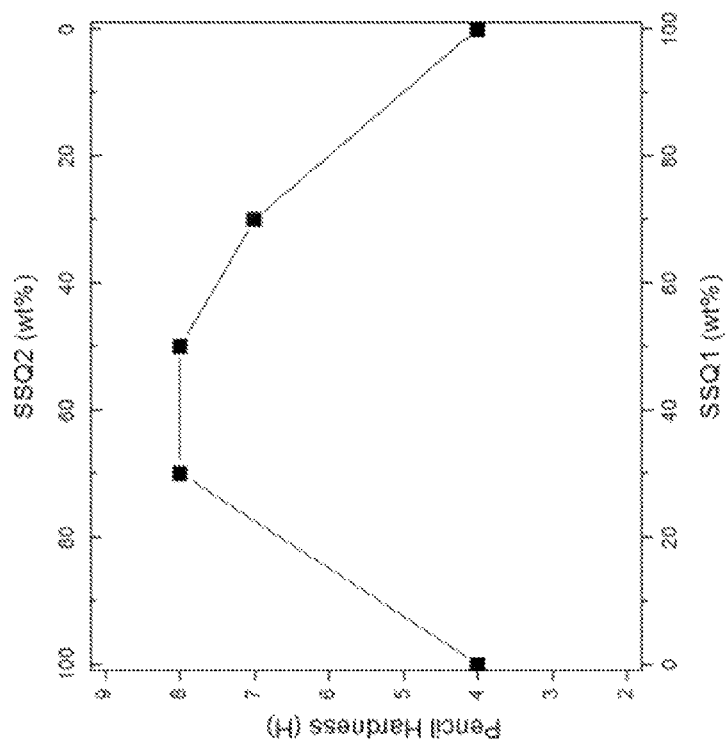
Figure 10:
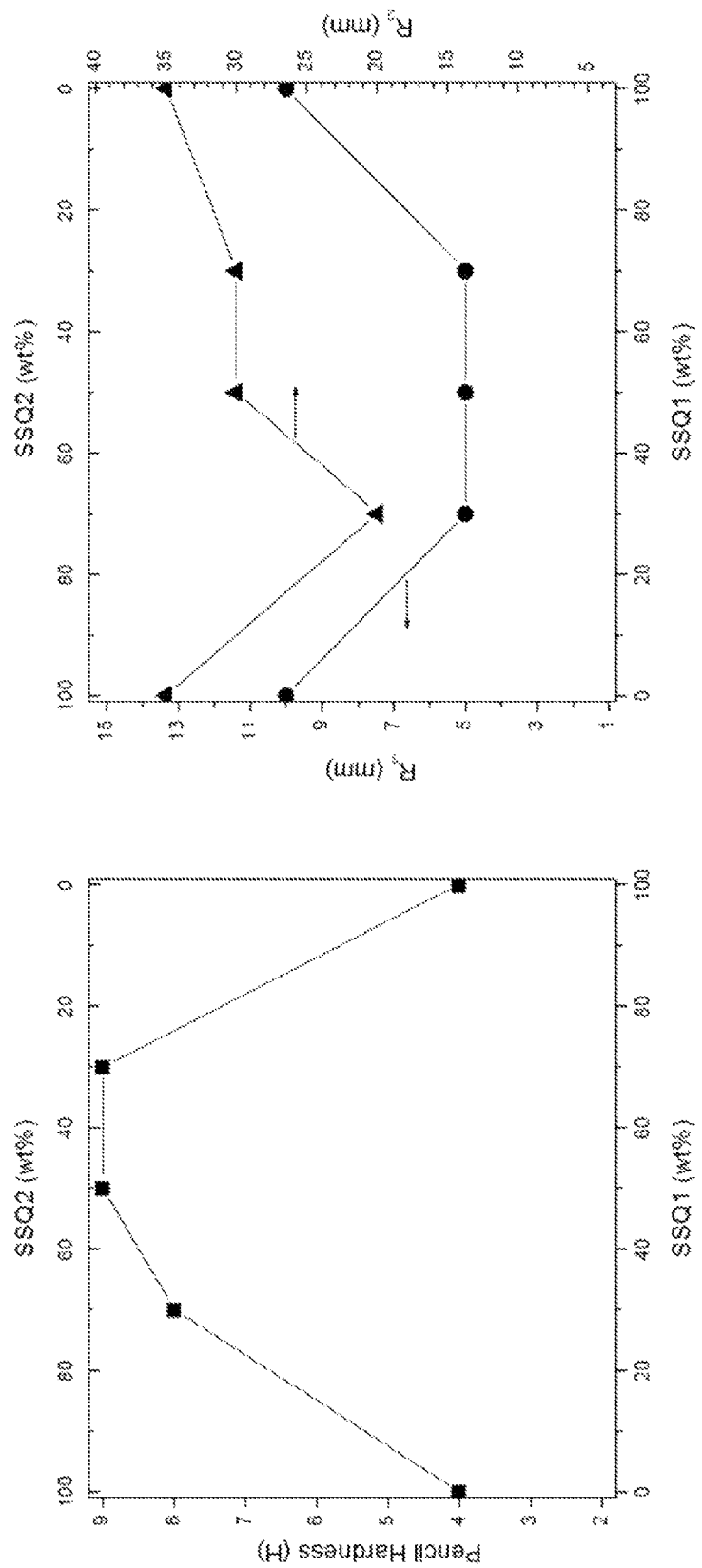
FIG. 10 shows a result of pencil hardness and flexibility evaluation according to a mixing ratio of the first and second silsesquioxane resins of a hard coating layer formed of the composition of Example 5.
Figure 11:
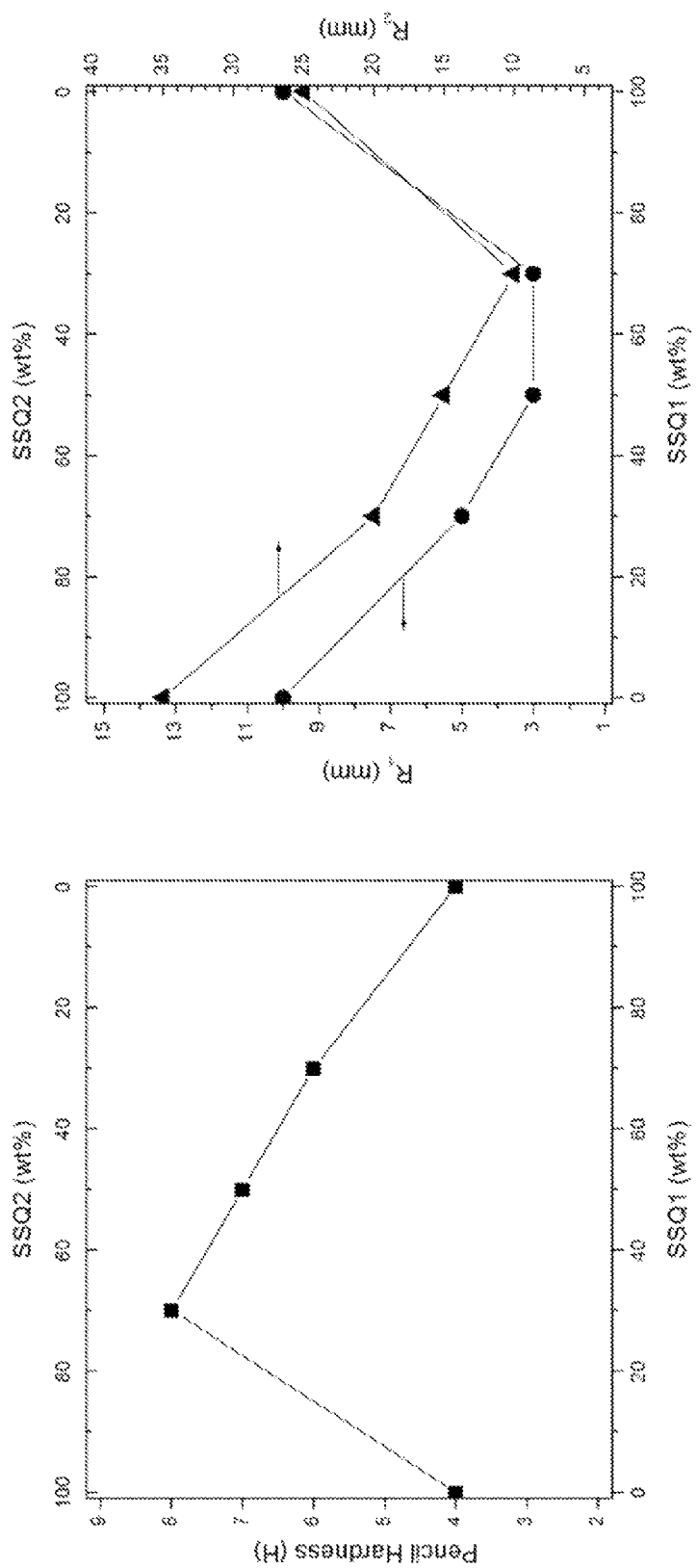
FIG. 11 shows a result of pencil hardness and flexibility evaluation according to a mixing ratio of the first and second silsesquioxane resins of a hard coating layer formed of the composition of Example 6.
Figure 12:
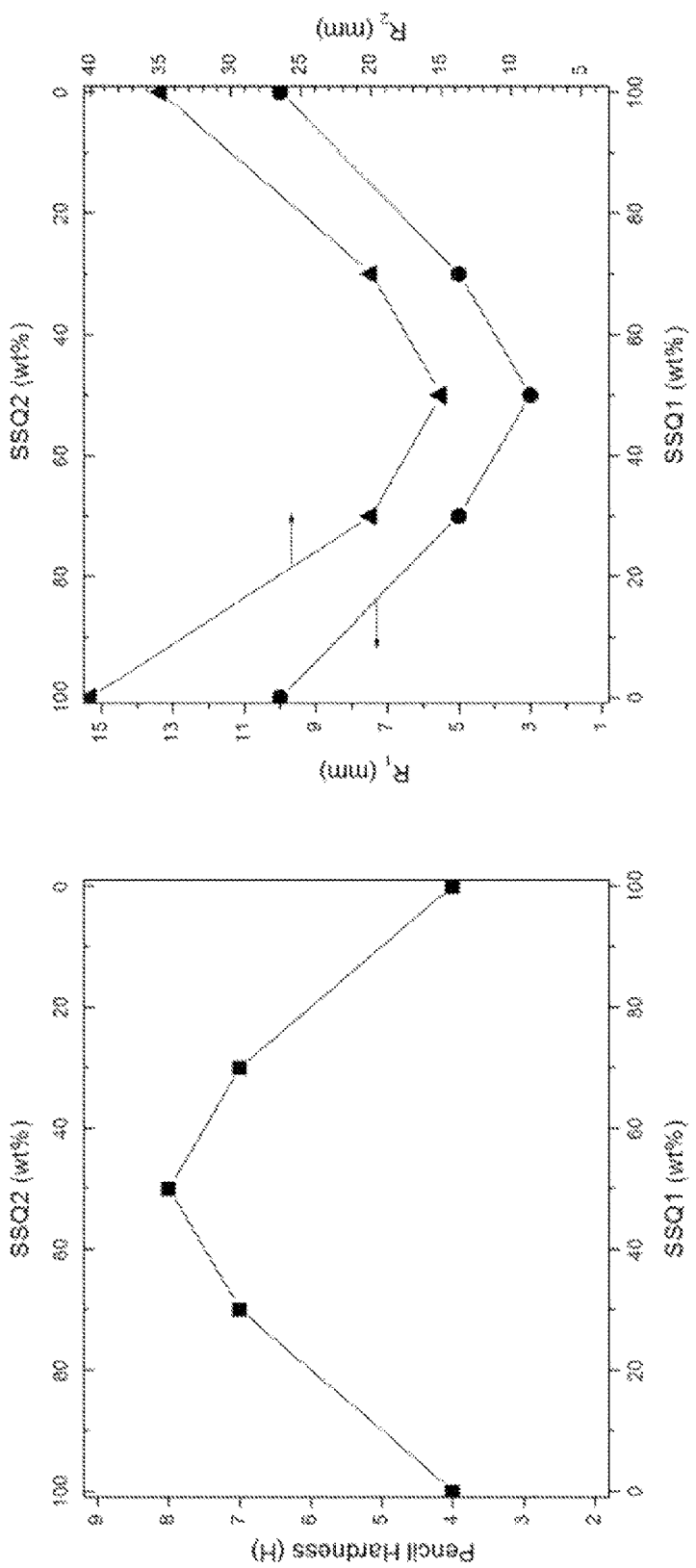
FIG. 12 shows a result of pencil hardness and flexibility evaluation according to a mixing ratio of the first and second silsesquioxane resins of a hard coating layer formed of the composition of Example 7.
Figure 13:
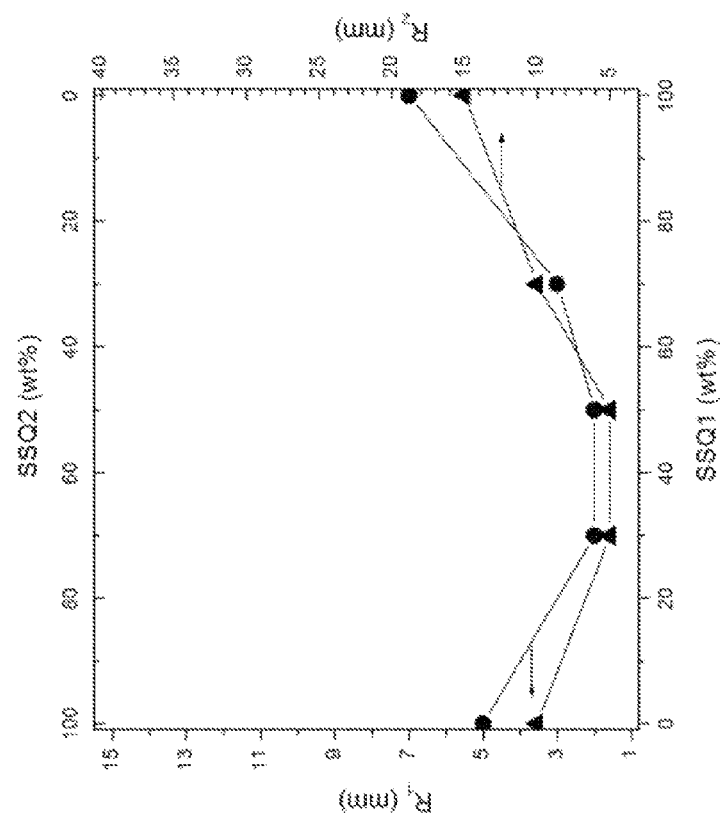
FIG. 13 shows a result of pencil hardness and flexibility evaluation according to a mixing ratio of the first and second silsesquioxane resins of a hard coating layer formed of the composition of Example 8.
Figure 13:
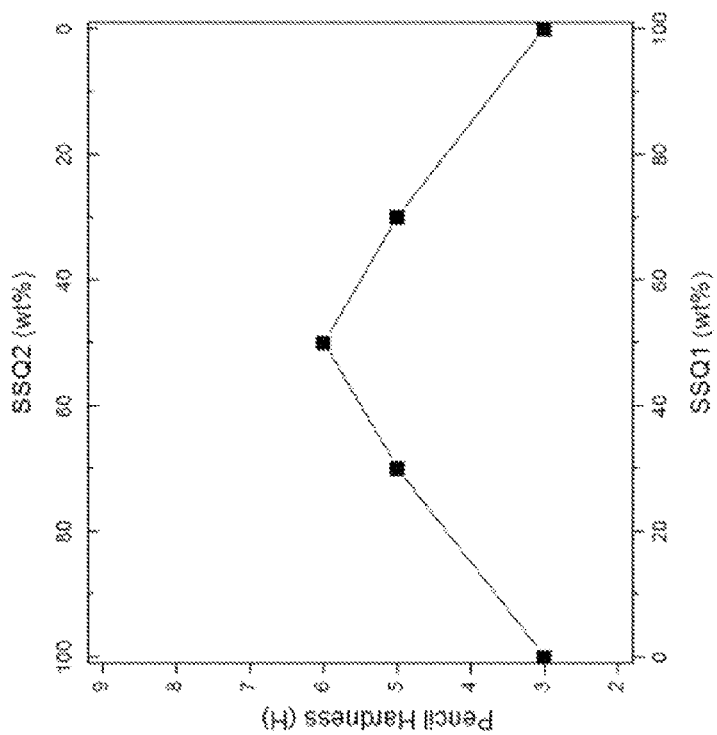
Figure 14:
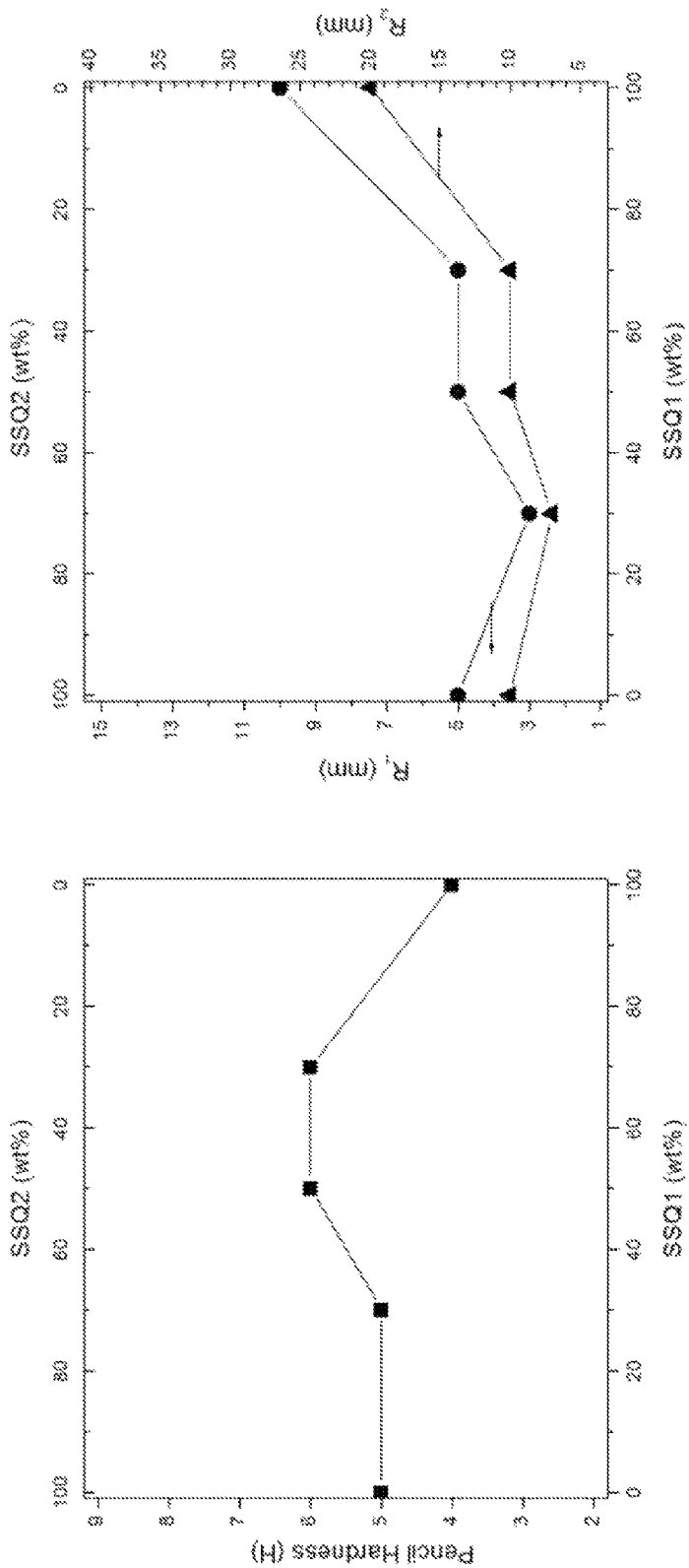
FIG. 14 shows a result of pencil hardness and flexibility evaluation according to a mixing ratio of the first and second silsesquioxane resins of a hard coating layer formed of the composition of Example 9.
Figure 15:
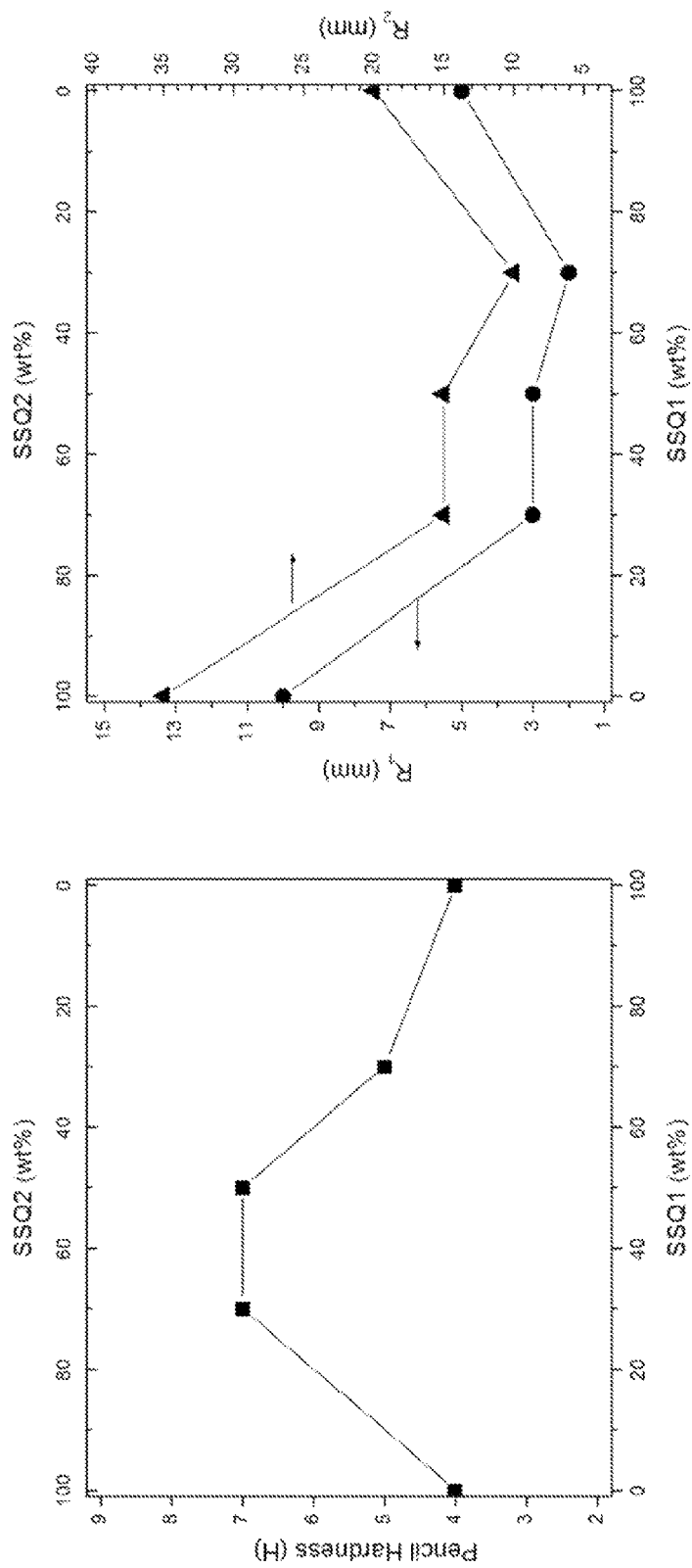
FIG. 15 shows a result of pencil hardness and flexibility evaluation according to a mixing ratio of the first and second silsesquioxane resins of a hard coating layer formed of the composition of Example 10.
Figure 16:
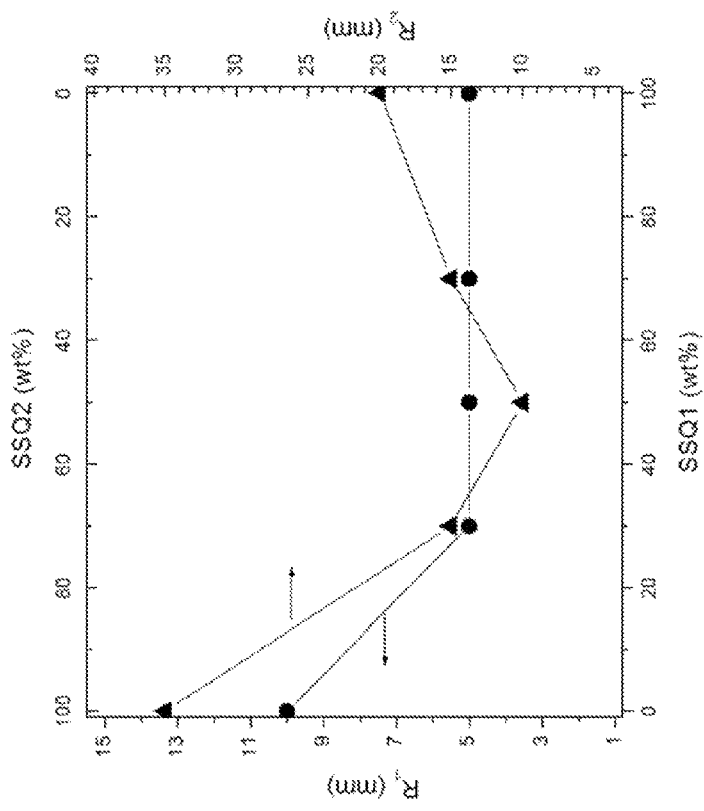
FIG. 16 shows a result of pencil hardness and flexibility evaluation according to a mixing ratio of the first and second silsesquioxane resins of a hard coating layer formed of the composition of Example 11.
Figure 16:
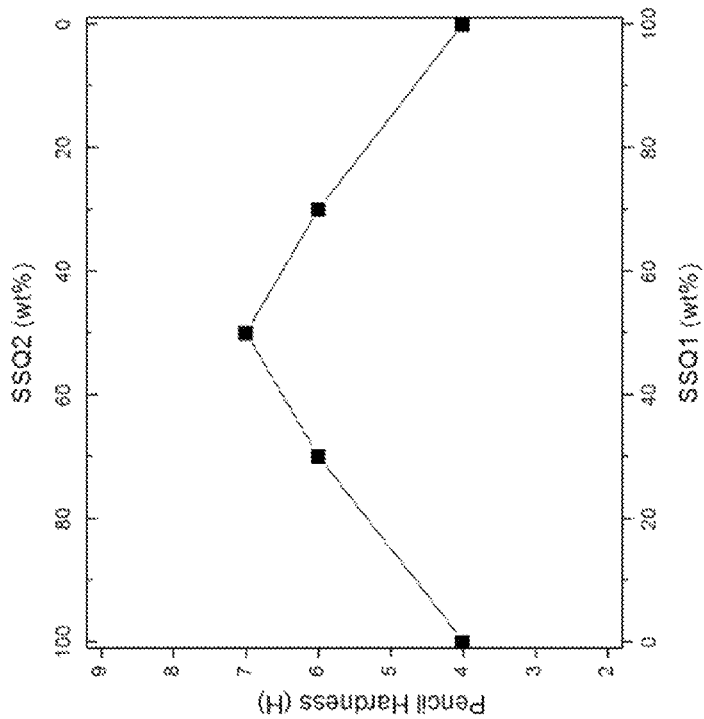
Figure 17:
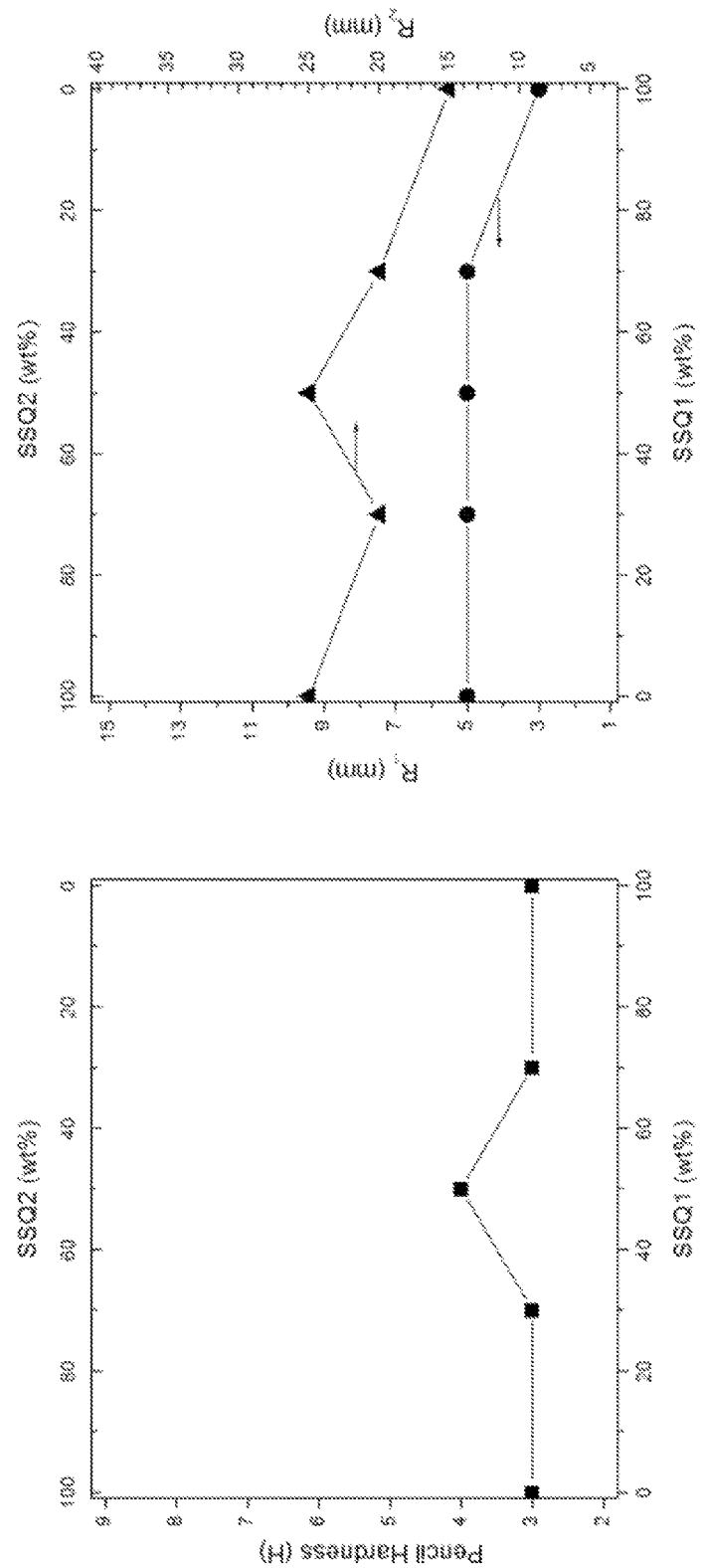
FIG. 17 shows a result of pencil hardness and flexibility evaluation according to a mixing ratio of the first and second silsesquioxane resins of a hard coating layer formed of the composition of Comparative Example 1.
Figure 18:
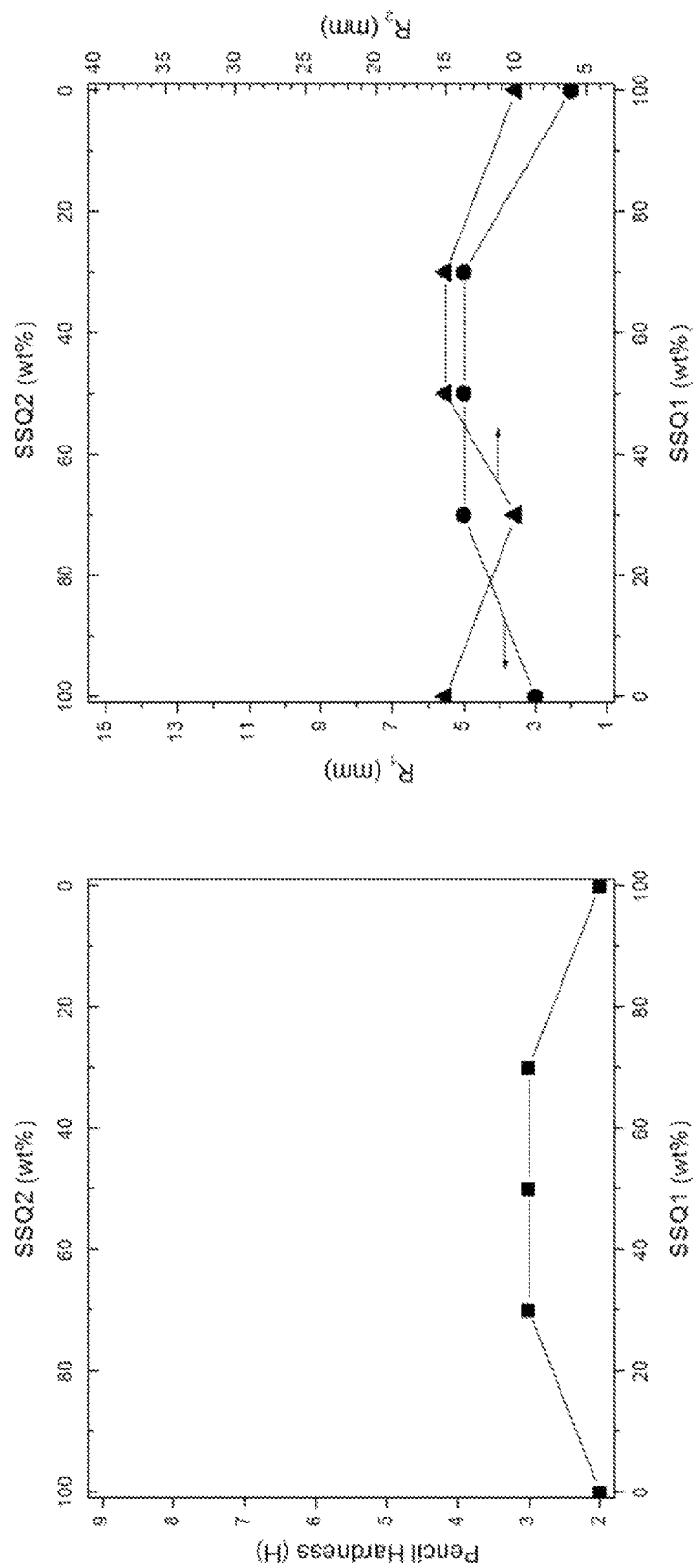
FIG. 18 shows a result of pencil hardness and flexibility evaluation according to a mixing ratio of the first and second silsesquioxane resins of a hard coating layer formed of the composition of Comparative Example 2.
Figure 19:
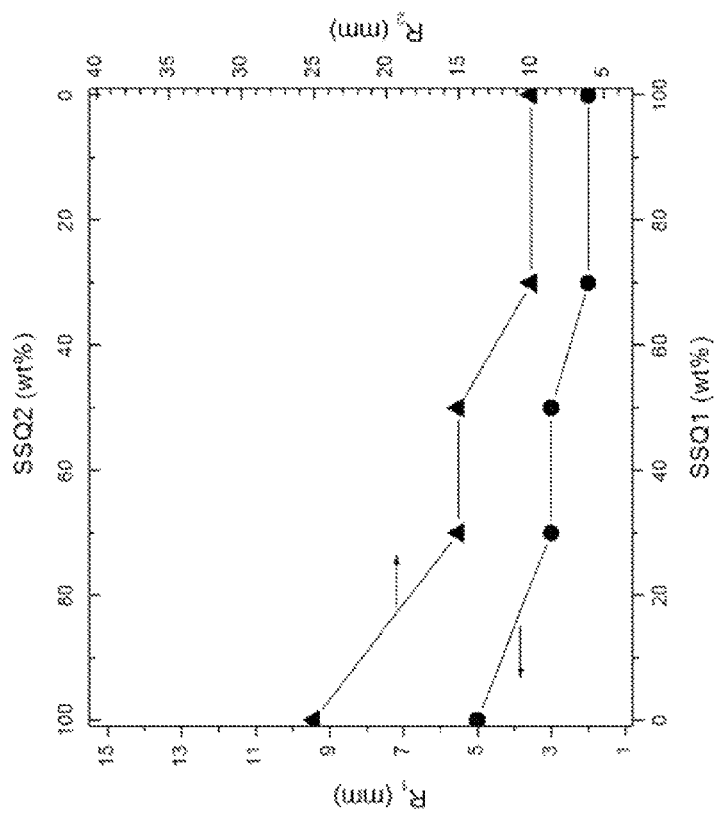
FIG. 19 shows a result of pencil hardness and flexibility evaluation according to a mixing ratio of the first and second silsesquioxane resins of a hard coating layer formed of the composition of Comparative Example 3.
Figure 19:
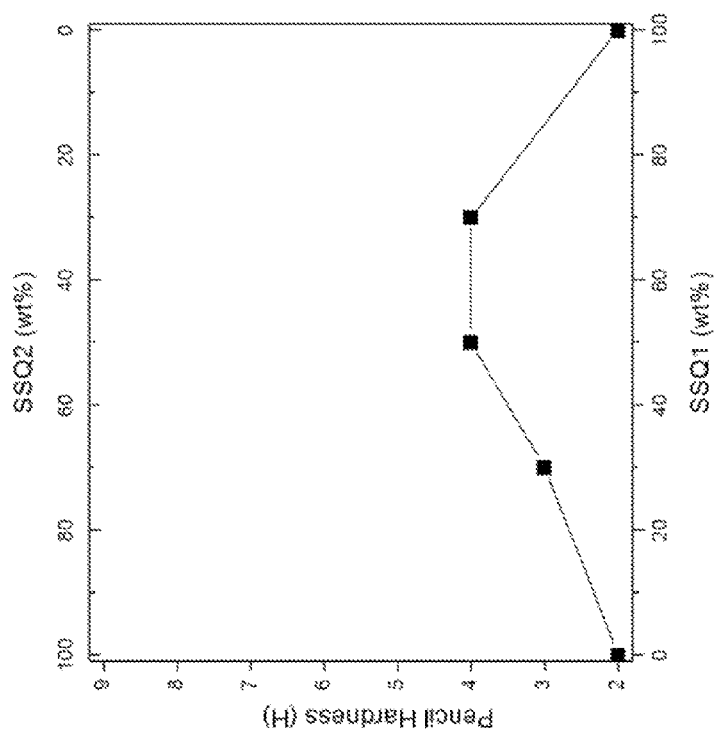
Figure 20:
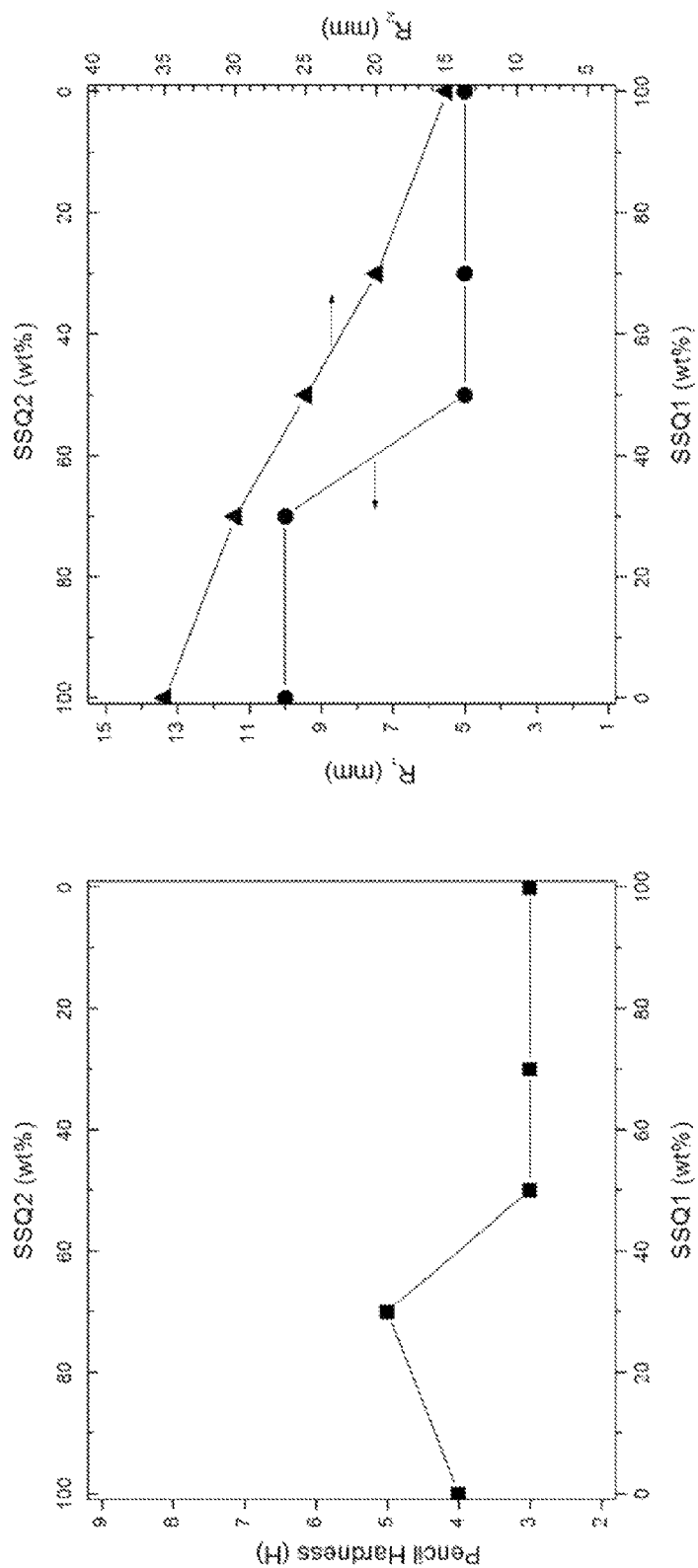
FIG. 20 shows a result of pencil hardness and flexibility evaluation according to a mixing ratio of the first and second silsesquioxane resins of a hard coating layer formed of the composition of Comparative Example 4.
Figure 21:
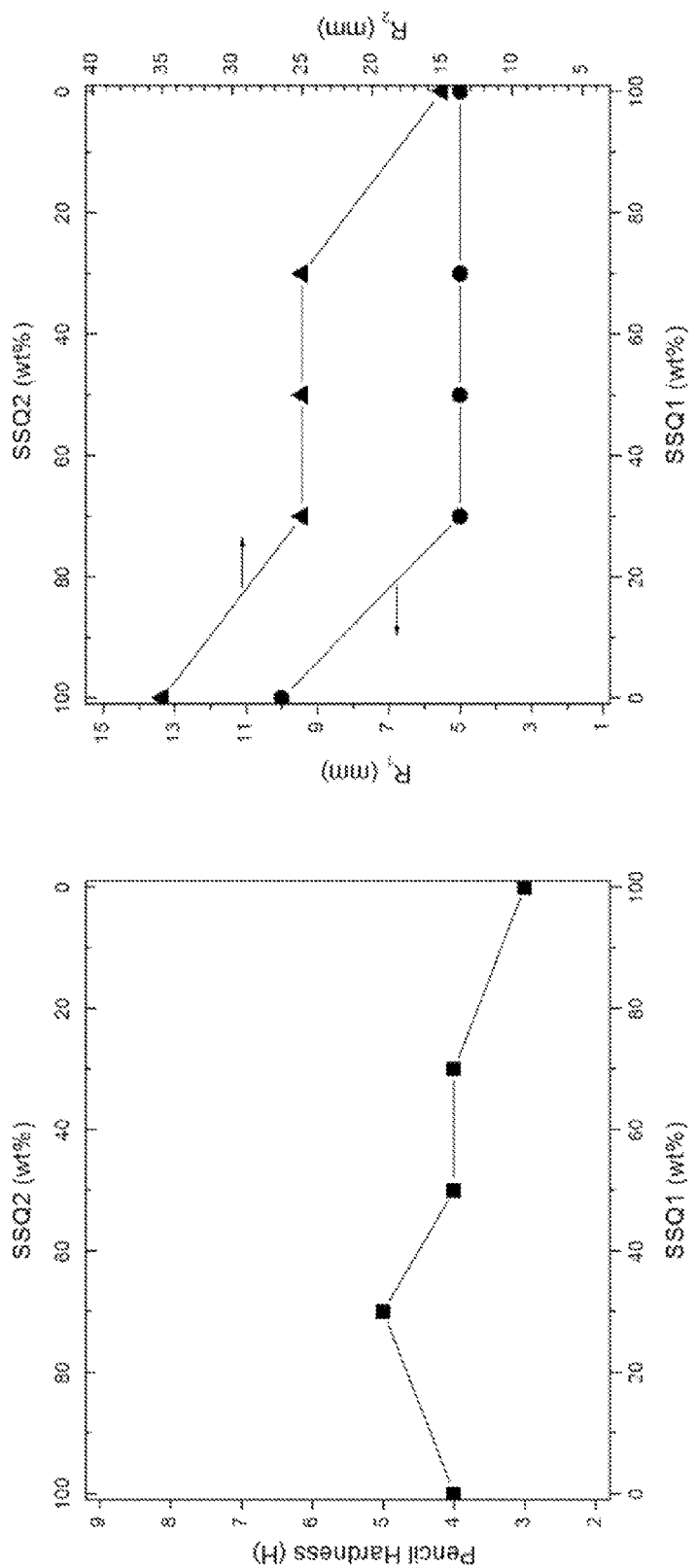
FIG. 21 shows a result of pencil hardness and flexibility evaluation according to a mixing ratio of the first and second silsesquioxane resins of a hard coating layer formed of the composition of Comparative Example 5.

Each result of the pencil hardness and flexibility evaluation was shown in FIG. 6 (Example 1), FIG. 7 (Example 2), FIG. 8 (Example 3), FIG. 9 (Example 4), FIG. 10 (Example 5), FIG. 11 (Example 6), FIG. 12 (Example 7), FIG. 13 (Example 8), FIG. 14 (Example 9), FIG. 15 (Example 10), FIG. 16 (Example 11), FIG. 17 (Comparative Example 1), FIG. 18 (Comparative Example 2), FIG. 19 (Comparative Example 3), FIG. 20 (Comparative Example 4) and FIG. 21 (Comparative Example 5).

Referring to the drawings, it may be determined that the hard coating films made from the compositions of Examples 1 to 11 exhibit excellent hardness, and have low $R_1$ and $R_2$ values showing excellent flexibility.

However, it may be determined that the hard coating films made from the compositions of Comparative Examples 1 to 5 is just able to implement either excellent hardness or flexibility, or is able to implement neither of them.

The composition according to the embodiment of the present invention can form a hard coating layer having significantly improved hardness.

The composition according to the embodiment of the present invention can form a hard coating layer having excellent flexibility such that curling is minimized. Accordingly, the hard coating film including the hard coating layer according to the embodiment of the present invention can ensure excellent flexibility without a separate anti-curl layer.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A composition for forming a hard coating layer, comprising:
   a first silsesquioxane resin and a second silsesquioxane resin, which have a weight average molecular weight of 500 or more but less than 30,000 and are substituted with a substituent of a (meth)acrylate group, a vinyl group or an epoxy group, the substituent having an equivalent ratio of 50% or more,
   wherein a hydrodynamic radius ratio of the first silsesquioxane resin to the second silsesquioxane resin is from 1.01 to 2.90, and wherein the first and second silsesquioxane resins are included at a weight ratio in a range of from 1:9 to 9:1, and wherein the first and second silsesquioxane resins are selected from the group consisting of complete-cage type resins, incomplete-cage type resins, ladder type resins, random type resins and mixtures thereof, provided that the first and second silsesquioxane resins are not both complete-cage type resins.

2. The composition of claim 1, wherein the hydrodynamic radius ratio of the first silsesquioxane resin to the second silsesquioxane resin is from 1.01 to 2.00.

3. The composition of claim 1, wherein the equivalent ratio of the substituent of the first silsesquioxane resin and second silsesquioxane resin is 80% or more, and the hydrodynamic radius ratio of the first silsesquioxane resin to the second silsesquioxane resin is from 1.01 to 1.50.

4. The composition of claim 1, wherein the first silsesquioxane resin and the second silsesquioxane resin are included at a weight ratio in a range of 3:7 to 7:3.

5. The composition of claim 1, wherein a total content of the first silsesquioxane resin and the second silsesquioxane resin is 10 to 90 wt % based on a total weight of the composition.

6. The composition of claim 1, further comprising an oligomer having a functional group which is crosslinkable with the first silsesquioxane resin and the second silsesquioxane resin.

7. The composition of claim 6, wherein the oligomer is a (meth)acrylate oligomer, a vinyl oligomer or an epoxy oligomer.

8. The composition of claim 1, further comprising a reactive monomer having a functional group which is crosslinkable with the first silsesquioxane resin and the second silsesquioxane resin.

9. The composition of claim 8, wherein the reactive monomer is a (meth)acrylate monomer, a vinyl monomer or an epoxy monomer.

10. The composition of claim 1, further comprising an inorganic filler.

11. The composition of claim 1, further comprising at least one type selected from the group consisting of a photo-radical polymerization initiator, a photo-cationic polymerization initiator and a thermal polymerization initiator.

12. A hard coating film, comprising a base material of which at least one surface has a hard coating layer formed of the composition of claim 1.

13. The film of claim 12, wherein the base material is made from least one resin selected from the group consisting of a polyester-based resin, a cellulose-based resin, a polycarbonate-based resin, an acrylic resin, a styrene-based resin, a polyolefin-based resin, a polyimide-based resin, a polyether sulfone-based resin and a sulfone-based resin.

14. The film of claim 12, wherein one surface of the base material has the hard coating layer, and another surface of the base material has an anti-curl back coating layer.

15. The film of claim 14, wherein a crack-preventing layer is further formed on the anti-curl back coating layer.

16. The film of claim 12, wherein the hard coating film is a window cover at an outermost surface of a display panel.

17. An image display device, comprising the hard coating film of claim 16.

* * * * *